United States Patent
Nakajima

[11] Patent Number: 6,158,187
[45] Date of Patent: Dec. 12, 2000

[54] COLLAPSIBLE STRUCTURE

[75] Inventor: Kazutaka Nakajima, Tokyo-To, Japan

[73] Assignee: Fuji Jukogyo Kabushiki Kaisha, Japan

[21] Appl. No.: 09/200,925

[22] Filed: Nov. 30, 1998

[30] Foreign Application Priority Data

Dec. 1, 1997 [JP] Japan .................................. 9-330662

[51] Int. Cl.$^7$ .................................................. E04H 12/18
[52] U.S. Cl. ................................ 52/646; 52/648; 52/645; 52/651.07; 52/648.1
[58] Field of Search ........................ 52/645, 646, 648.1, 52/651.07

[56] References Cited

FOREIGN PATENT DOCUMENTS 0284688  10/1988  European Pat. Off. .
49-26653  7/1974  Japan .
7-94236  10/1995  Japan .

OTHER PUBLICATIONS

K.A. Takamatsu, et al., "New Deployable Truss Concepts for Large Antenna Structures or Solar Concentrators," *Journal of Spacecraft and Rockets*, vol. 28, No. 3 (1991), pp. 330–338.

*Primary Examiner*—Carl D. Friedman
*Assistant Examiner*—Patrick J. Chavez
*Attorney, Agent, or Firm*—Smith, Gambrell & Russell, LLP

[57] ABSTRACT

A collapsible structure comprises a base member (B), a lower unit (10) comprising a first side structure (11) having a base end hinged to the base member (B) and a second side structure (16), an upper unit (20) comprising a first side structure (21) having one end hinged to an extremity of the second side structure (16) of the lower unit (10), and a second side structure (27) having one end hinged to the first side structure (16) of the lower unit (10) and the other end hinged to the first side structure (21) of the upper unit (20). The first and the second side structure (11, 16) of the lower unit (10) are laid down, the second side structure (27) of the upper unit (20) is laid down on the first side structure (11) of the lower unit (10), and the first side structure (21) of the upper unit (20) is laid down on the second side structure (16) of the lower unit (10) in a folded state for storing.

17 Claims, 25 Drawing Sheets

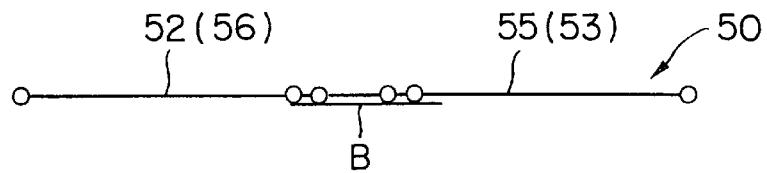
FIG. 6A
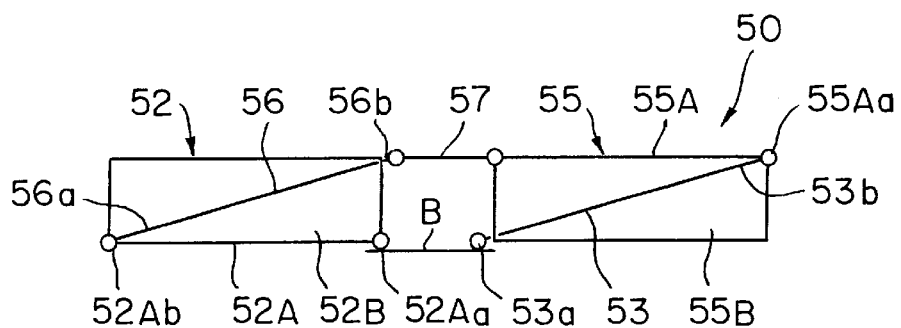
FIG. 6B
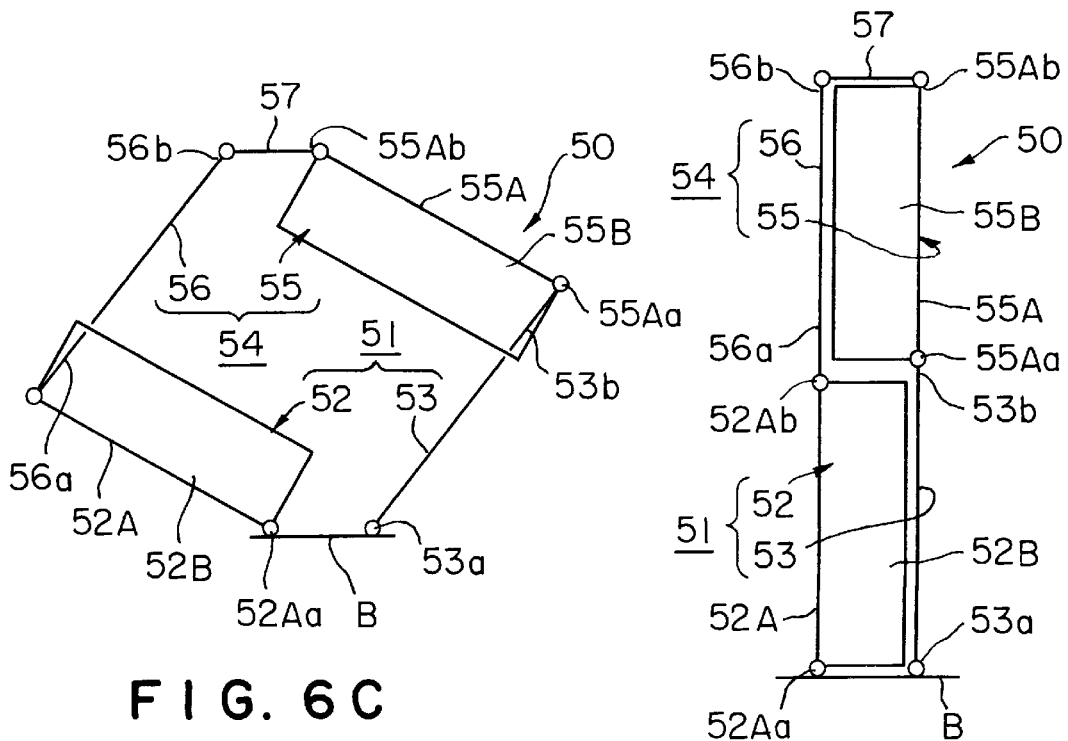
FIG. 6C
FIG. 6D

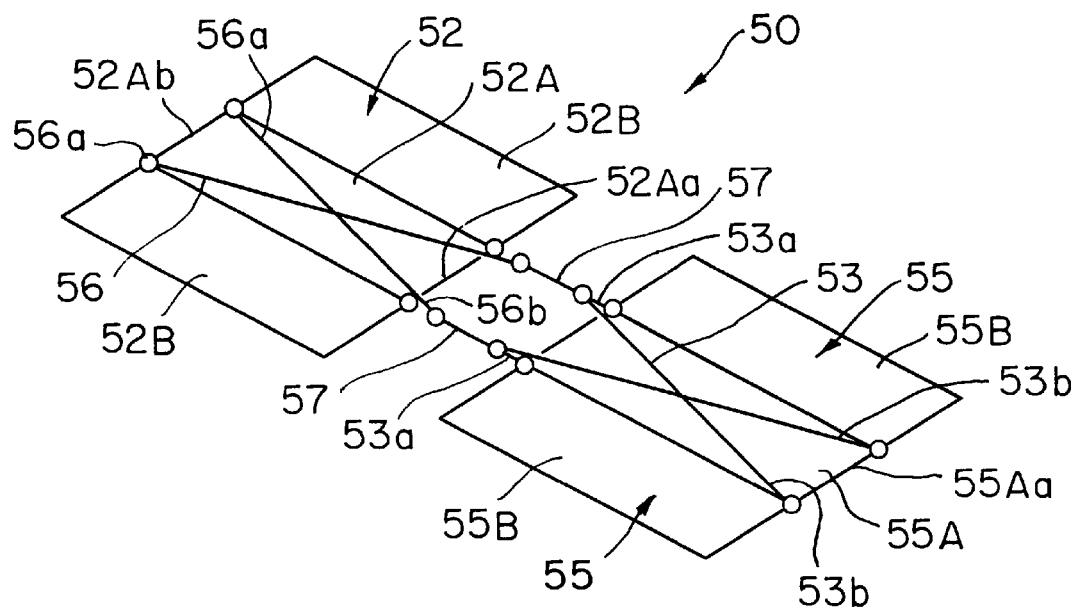
F I G. 7A
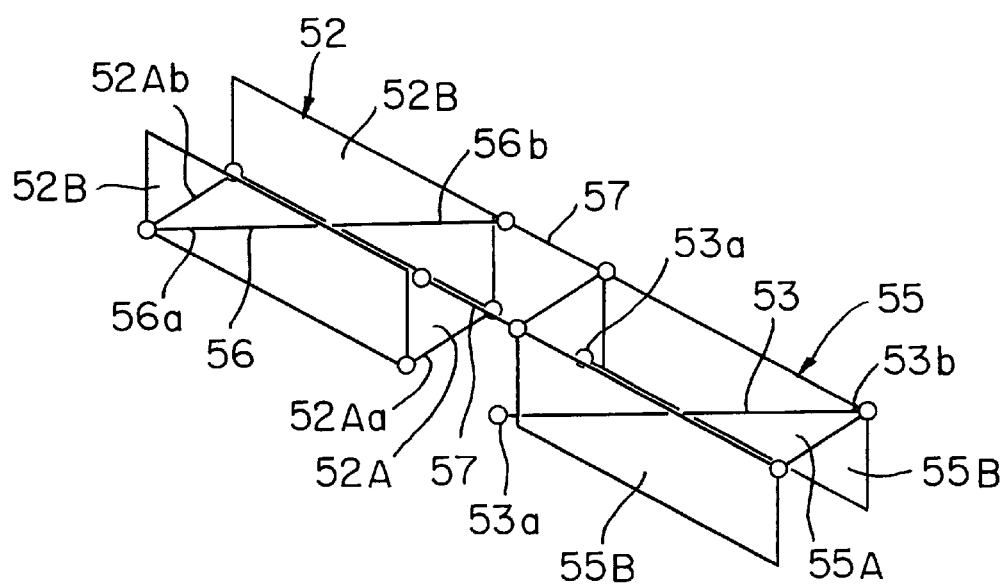
F I G. 7B

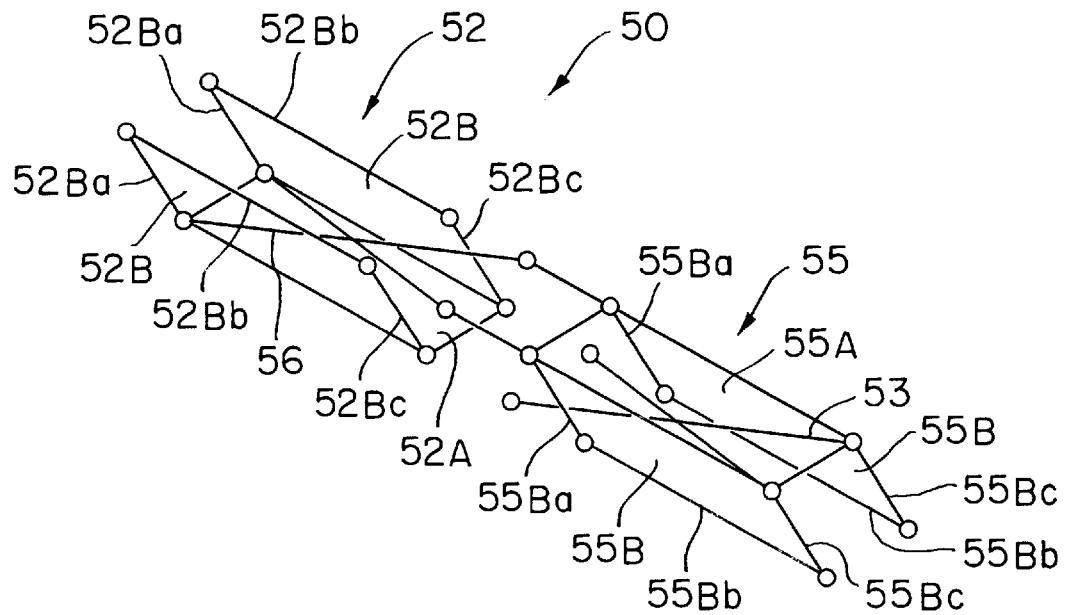
F I G. 8A
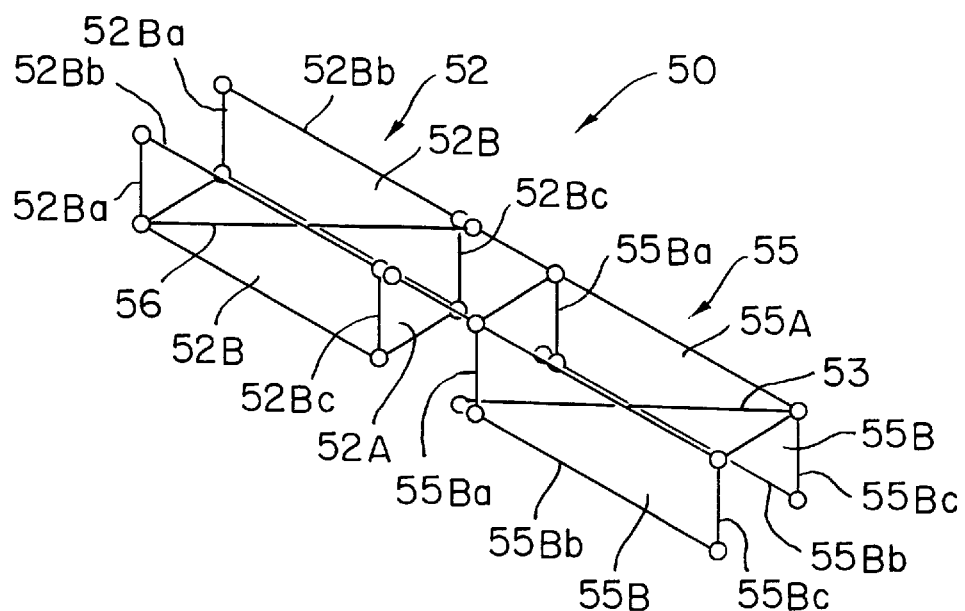
F I G. 8B

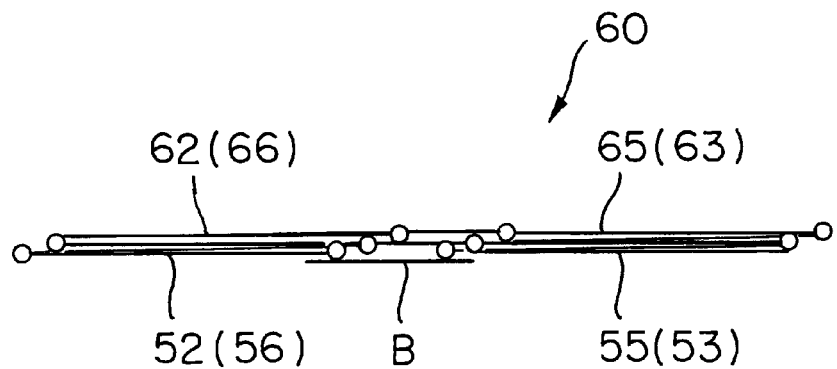
F I G. 9A
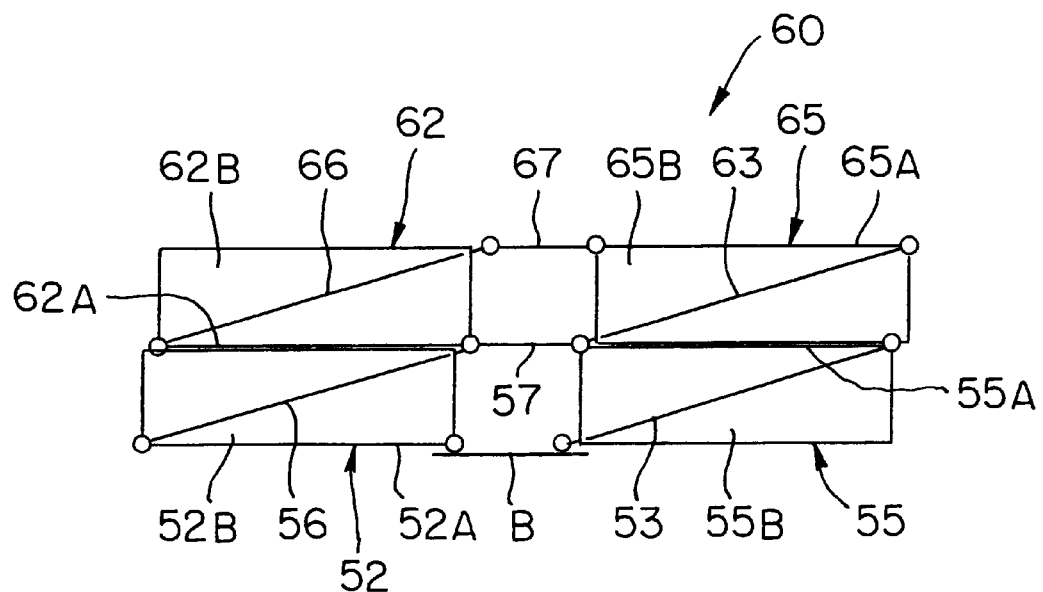
F I G. 9B

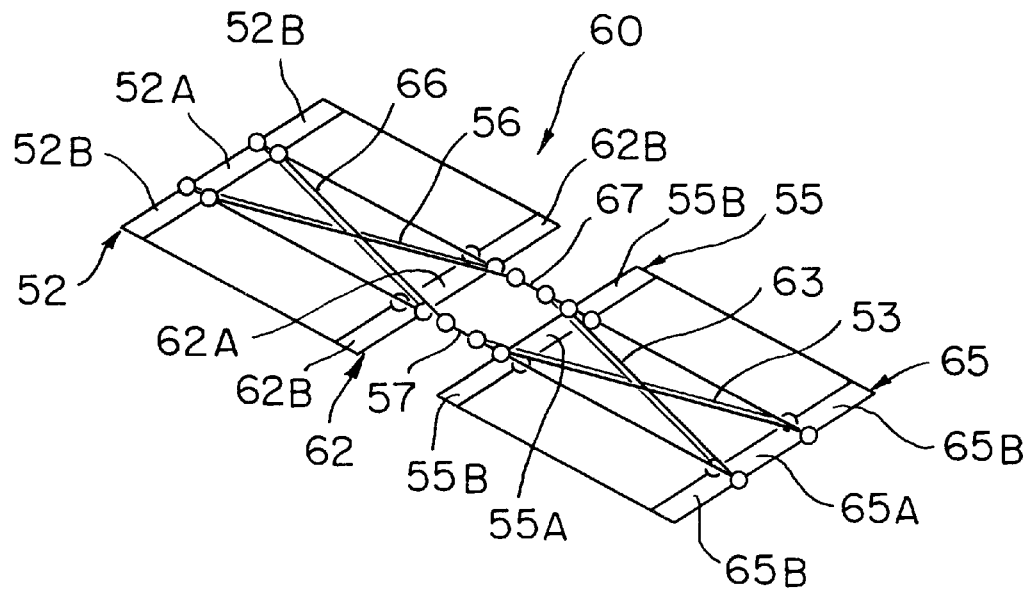
F I G. 10A
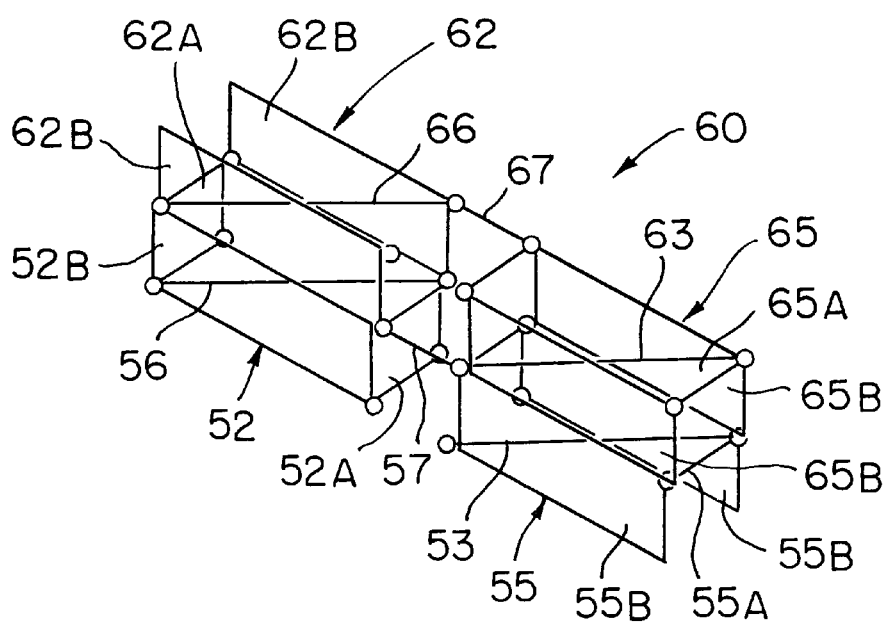
F I G. 10B

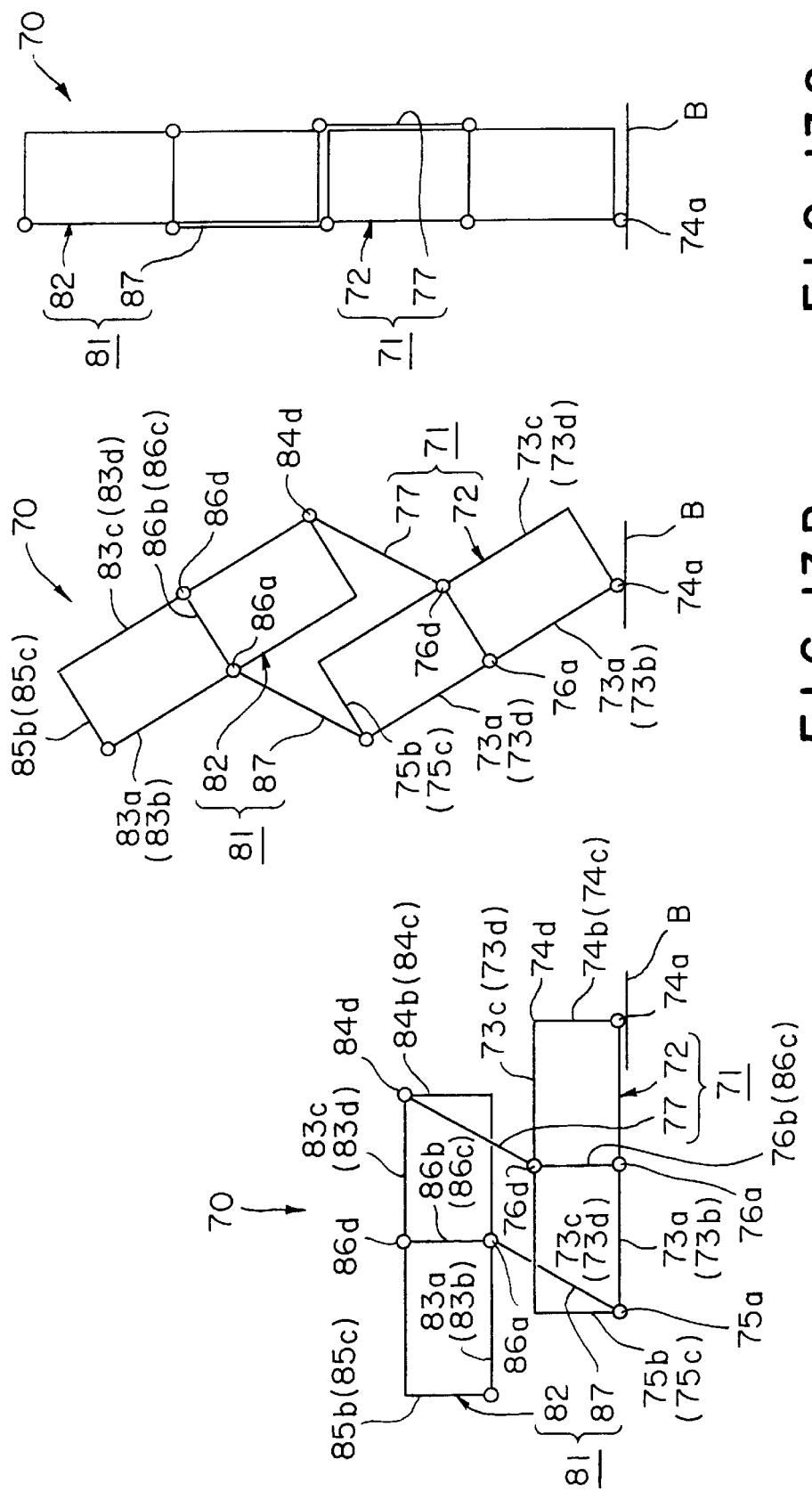

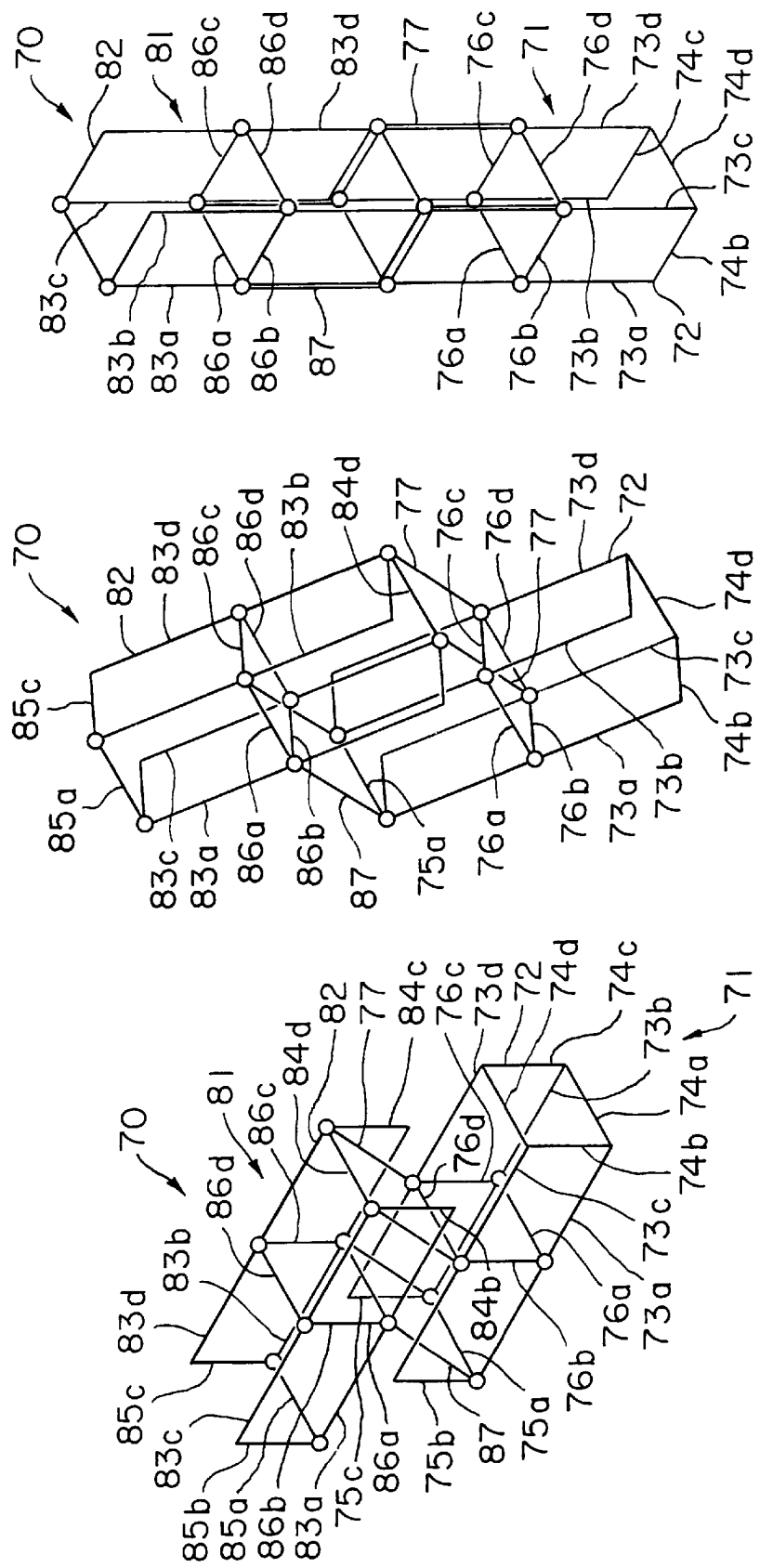

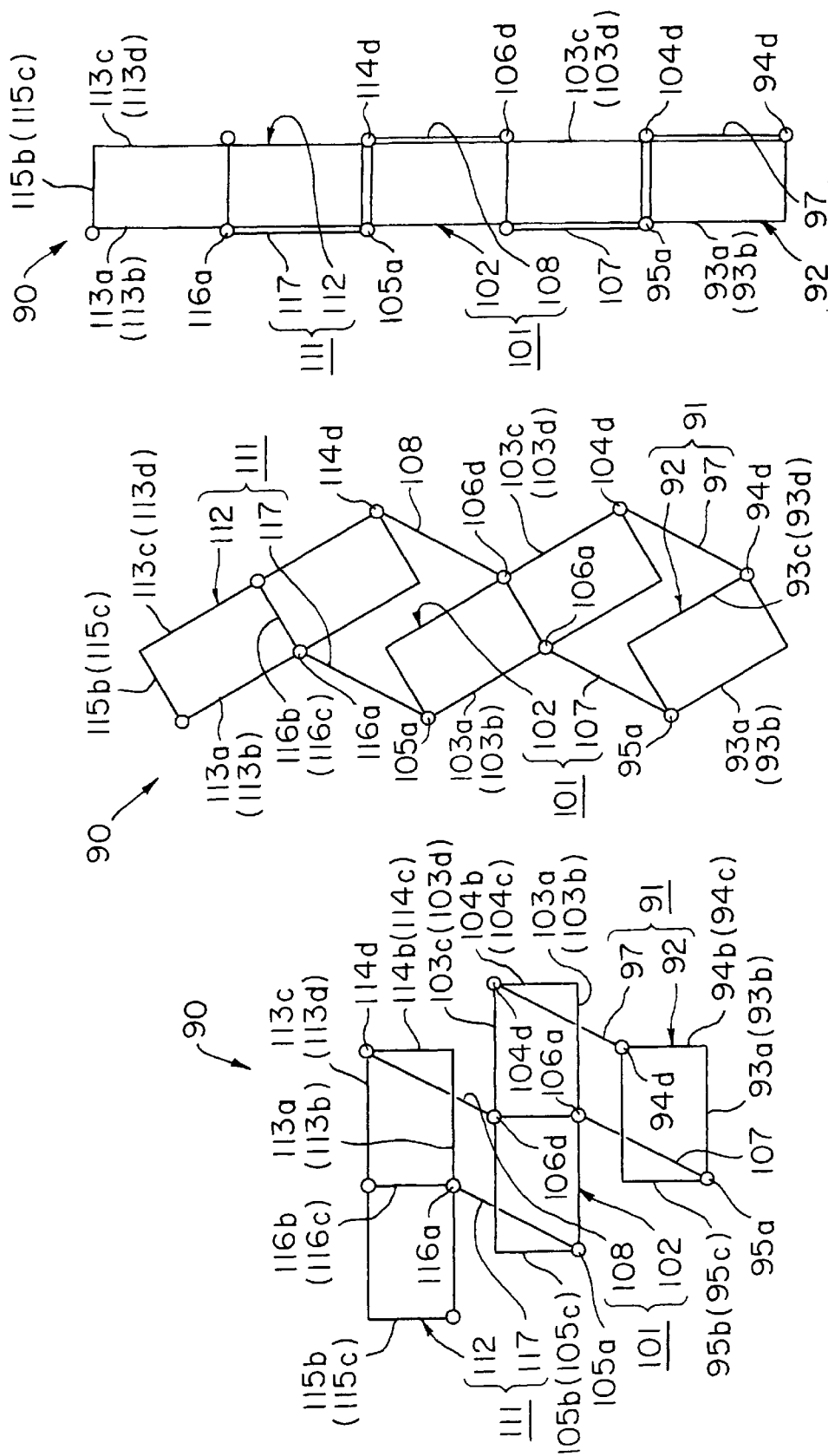

COLLAPSIBLE STRUCTURE

BACKGROUND OF THE INVENTION

1. Field of the Invention

The present invention relates to a large- or medium-sized collapsible (foldable, spreadable) structure for use in outer space for constructing space colonies, solar power satellite systems, large antennas, space stations and the like or for use on the ground for constructing portable emergency temporary buildings.

2. Description of the Related Art

The volume and weight of payloads to be carried into outer space by a launch vehicle, such as a rocket or a space shuttle, are subject to restrictions placed by the launching ability of the launch vehicle. Therefore, structures to be used in outer space must be lightweight, collapsible for carrying, capable of being easily assembled in outer space and rigid. Under such circumstances, a collapsible structure is considered to be a promising space structure. The collapsible structure is folded in a small volume for launching and is unfolded in outer space in a desired form.

Such a collapsible structure is disclosed in, for example, JP-B No. 26653/1974. This prior art collapsible structure is folded by folding the members thereof at joints placed in their middle parts and has a complex construction. Particularly, the middle parts of the members most subject to buckling have low rigidity and low strength, so that the rigidity and strength of the collapsible structure as unfolded are not necessarily high enough.

The mechanism of the collapsible structure for used in outer space must be highly reliable to enable the collapsible structure to be surely unfolded automatically or semiautomatically in outer space. The applicant of the present patent application previously proposed a rigid, strong collapsible structure comprising members, which are not folded at their middle parts as shown in FIG. 23 in JP-B No. 94236/1995. This collapsible structure has a first set of horizontal members A, B, C and D connected by joints a, b, c and d in a quadrilateral, a second set of horizontal members I, J, K and L connected by joints e, f, g and h in a quadrilateral, and four vertical members E, F, G and H having lower ends connected to the joints a, b, c and d, respectively, and rising from the joints a, b, c and d perpendicularly to a plane including the horizontal members A, B, C and D. The vertical member G, i.e., one of the vertical members E, F, G and H, is longer than the rest. The upper ends of the vertical members E, F and H, and a part of the vertical member G on the same level as the upper ends of the vertical members E, F and H are connected to the joints e, f, h and g, respectively. The vertical member G is provided with a slide hinge M placed on top of the joint g. A diagonal member N connects the joint a and the slide hinge M.

As the slide hinge M slides away from the joint c along a part of the long vertical member G extending upward from the joint g, the diagonal member N is pulled toward the vertical member G, and the vertical member E connected to the joint a approaches the long vertical member G. Consequently, the horizontal members A, B, C, D, I, J, K and L turn on the corresponding joints and, eventually, the diagonal member N, all the short vertical members E, F and H, and the horizontal members A, B, C, D, I, J, K and L are gathered around the long vertical member G so as to extend along the long vertical member G to collapse the collapsible structure. This procedure is reversed to unfold the folded collapsible structure.

Thus, the component members of the prior art collapsible structure need not be folded at their middle parts and need not be contracted to collapse the collapsible structure, and the unfolded collapsible structure has high rigidity and strength. Although the vertical members and the horizontal members are gathered around the long vertical member and the collapsible structure can be folded in a folded structure having small lateral dimensions, the longitudinal dimensions of the folded structure are not necessarily small.

SUMMARY OF THE INVENTION

Accordingly, a primary object of the present invention is to provide a collapsible structure sufficient in rigidity and strength when unfolded, and capable of being folded in a folded structure having small lateral and longitudinal dimensions and of being easily stored in a small space.

According to a first aspect of the present invention, a collapsible structure capable of being set in a folded state and an unfolded state comprises: a base member; a first lower unit comprising a first side structure having a base end hinged to the base member, and a second side structure separated from the first side structure and having a base end hinged to the base member; and a first upper unit comprising a first side structure having one end hinged to an extremity of the second side structure of the first lower unit, and a second side structure having one end hinged to the first side structure of the first lower unit and the other end hinged to the first side structure of the first upper unit. In this collapsible structure, the first and the second side structure of the first lower unit are laid down so that the respective extremities thereof are separated from each other, the second side structure of the first upper unit is laid down on the first side structure of the first lower unit, and the first side structure of the first upper unit is laid down on the second side structure of the first lower unit in a folded state, and the first and the second side structure of the first lower unit are set up on the base member, and the first upper unit having the first and the second side structure is set up on the first lower unit in an unfolded state.

In the collapsible structure according to the first aspect of the present invention, the first and the second side structure of the first lower unit are laid down, the second side structure of the first upper unit is put on the first side structure of the first lower unit so as to extend along the latter, and the first side structure of the first upper unit is put on the second side structure of the first lower unit so as to extend along the latter to store the folded collapsible structure. Thus, the folded collapsible structure has a very small height and has a flat shape, and the unfolded collapsible structure has sufficient rigidity and strength because the component structures need not be folded at middle parts and need not be contracted.

In the collapsible structure according to the first aspect of the present invention, it is preferable that the first side structure of the first lower unit has a U-shaped cross section and has a main substructure having a base end pivotally supported on the base member and a pair of opposite side substructures connected to the opposite side edges of the main substructure, the second side structure of the first lower unit has a base end pivotally supported on the base member and has a flat shape, the first and the second side structure form the first lower unit of a substantially rectangular cross section in the unfolded state, the first side structure of the first upper unit has a substantially U-shaped cross section and has a main substructure having a base end pivotally supported on the second side structure of the first lower unit and a pair of opposite side substructures connected to the opposite side edges of the main substructure, the second side structure of the first upper unit has a base end pivotally supported on the first side structure of the first lower unit and has a flat shape, and the first and the second side structure form the first upper unit of a substantially rectangular cross section in the unfolded state. Thus, the first and the second side structure form the lower unit having the substantially rectangular cross section, the first and the second side structure form the first upper unit having the substantially rectangular cross section, and the collapsible structure can be folded in a compact structure with the second side structure of the first upper unit fitted in a space between the side substructures of the first side structure of the first lower unit, and the second side structure of the first lower unit fitted in a space between the side substructures of the first side structure of the first upper unit in a folded state.

It is preferable that the respective other ends of the first and the second side structure of the first upper unit are connected pivotally by upper members. When the first and the second side structure of the first upper unit are thus connected, he upper member can be flat and the collapsible structure can be folded in a flat shape.

It is preferable that the respective side substructures of the first side structure of the first lower unit and the first side structure of the first upper unit are capable of being turned on the opposite side edges of the corresponding main substructures between a perpendicular position perpendicular to the corresponding main substructures and a parallel position parallel to the corresponding main substructures. When the side substructures are set in the parallel position, the collapsible structure can be folded in a further flat shape.

A plurality of such collapsible structures may be arranged in a row so as to be movable toward and away from each other by pivotally connecting the end parts of side substructures to build a large collapsible structure.

The respective side substructures of the first side structure of the first lower unit and the first side structure of the first upper unit may be capable of being turned on the opposite side edges of the corresponding main substructures so as to be turned down on the corresponding main substructures. When the side substructures are thus turned down on the main substructures, the side substructures do not project from the folded collapsible structure and the collapsible structure can be folded in a flat shape.

A plurality of such collapsible structures may be arranged with the side substructures of the adjacent first side structures and those of the adjacent first side structures joined together, respectively, or with the adjacent first side structures and the adjacent first side structures sharing the side substructures, respectively. A large collapsible structure can be built by thus combining the plurality of collapsible structures.

According to a second aspect of the present invention, the collapsible structure further comprises a second lower unit and a second upper unit. In this collapsible structure, the second lower unit has a first side structure having one end pivotally supported on one end of each of the upper members of the first unit and a second side structure having one end pivotally supported on the other ends of the upper members of the first unit, the second upper unit has a first side structure having one end pivotally supported on the other end of the second side structure of the second lower unit, a second side structure having one end pivotally supported on the other end of the first side structure of the second lower unit, and an upper member pivotally connected to the other end of the second side structure and the other end of a main substructure of the first side structure.

When the collapsible structure according to the second aspect of the present invention is unfolded, a plurality of collapsible structures can be disposed above the first unit to build a large collapsible structure.

It is preferable that the side substructures of the first side structures of the first units and the first side structures of the second units are capable of being turned on the side edges of the corresponding main substructures between a perpendicular position perpendicular to the corresponding main substructures and a parallel position parallel to the corresponding main substructures. When the side substructures are set in the parallel position, the collapsible structure can be folded in a further flat shape.

A plurality of collapsible structures similar to the collapsible structure according to the second aspect of the present invention can be arranged in a row so as to be movable toward and away from each other by pivotally connecting the end parts of the side substructures thereof to build a large collapsible structure.

The side respective substructures of the first side structure of the first and second lower unit, and the respective side substructure of the first side structures of the first and second upper units may be capable of being turned on the opposite side edges of the corresponding main substructures so as to be turned down on the corresponding main substructures. When the side substructures are thus turned down on the main substructures, respectively, the side substructures do not project from the folded collapsible structure and the collapsible structure can be folded in a flat shape.

A plurality of such collapsible structures may be arranged with the side substructures of the adjacent first side structures of the first and second lower units, and the adjacent first side structures of the first and second upper units joined together or with the adjacent first side structures of the first and second lower units sharing the side substructures, and the adjacent first side structures of the first and second upper units sharing the side substructures. A large collapsible structure can be build by thus combining the plurality of collapsible structures.

According to a third aspect of the present invention, a collapsible structure comprises a base member; a lower unit capable of being laid down and set up on the base member; and an upper unit capable of being laid down on the base member and of being set up on the lower unit set up on the base member. In this collapsible structure, the lower unit has a first side structure having one end pivotally supported on the base member, and a second side structure having one end pivotally supported on the first side structure; the upper unit has a first side structure having one end pivotally supported on the other end of the second side structure of the lower unit, and a second side structure having one end pivotally supported on the first side structure of the lower unit and the other end supported pivotally on the first side structure of the upper unit; the first side structure of the lower unit is laid down on the base member and the first side structure of the upper unit is laid down on the first side structure of the lower unit when the collapsible structure is in a folded state; the first side structure of the lower unit is set up on the base member, and the first side structure of the upper unit is set up on the first side structure of the lower unit set up on the base member by turning the second side structure of the lower unit and the second side structure of the upper unit when the collapsible structure is in an unfolded state.

When the collapsible structure is folded, the first side structure of the lower unit is laid down on the base member, and the first side structure of the upper unit is laid down on the first side structure of the lower unit. The folded collapsible structure has a small height and has a flat shape. Since the structures are neither folded not contracted, the unfolded collapsible structure has high rigidity and strength.

In the collapsible structure according to the third aspect of the present invention, it is preferable that each of the first side structure of the lower unit and the first side structure of the upper unit are formed by assembling a plurality of longitudinal members, lower transverse members, upper transverse members and intermediate transverse members, and the first side structure and the first side structure are connected pivotally by the second side structure of the lower unit and the second side structure of the upper unit.

It is preferable that the first longitudinal member and the third upper transverse member, the third upper transverse member and the third longitudinal member, the third longitudinal member and the second lower transverse member, and the second lower transverse member and the first longitudinal member of each of the lower unit and the upper unit are connected pivotally so that those members can be folded so as to extend along the first longitudinal member, the second longitudinal member and the second upper transverse member, the second upper transverse member and the fourth longitudinal member, the fourth longitudinal member and the third lower transverse member, and the third lower transverse member and the second longitudinal member of each of the lower unit and the upper unit are connected pivotally so that those members can be folded so as to extend along the second longitudinal member.

Since the connected members can be turned relative to each other, the collapsible structure can be folded in a flat shape suitable for storing.

BRIEF DESCRIPTION OF THE DRAWINGS

Preferred embodiments of the present invention will become understood from the following detailed description referring to the accompanying drawings, in which:

FIGS. 6A, 6B, 6C and 6D are diagrammatic views of assistance in explaining a collapsible structure in a second embodiment according to the present invention;

FIGS. 7A, 7B, 7C and 7D are diagrammatic perspective views respectively corresponding to FIGS. 6A, 6B, 6C and 6D;

FIGS. 8A and 8B are diagrammatic perspective views of assistance in explaining a collapsible structure in a modification of the collapsible structure in the second embodiment;

FIGS. 9A, 9B, 9C and 9D are diagrammatic views of assistance in explaining a collapsible structure in a third embodiment according to the present invention;

FIGS. 10A, 10B, 10C and 10D are diagrammatic perspective views respectively corresponding to FIGS. 9A, 9B, 9C and 9D;

FIGS. 13A, 13B and 13C are diagrammatic views of assistance in explaining a collapsible structure in a modification of the collapsible structure in the fourth embodiment;

FIGS. 14A, 14B and 14C are diagrammatic perspective views respectively corresponding to FIGS. 13A, 13B and 13C;

FIGS. 16A, 16B and 16C are diagrammatic views of assistance in explaining a collapsible structure in a fifth embodiment according to the present invention;

DESCRIPTION OF THE PREFERRED EMBODIMENTS

First Embodiment

A collapsible structure in a first embodiment according to the present invention will be described with reference to FIGS. 1, 2, 3, 4, 5A and 5B.

Figure 1:
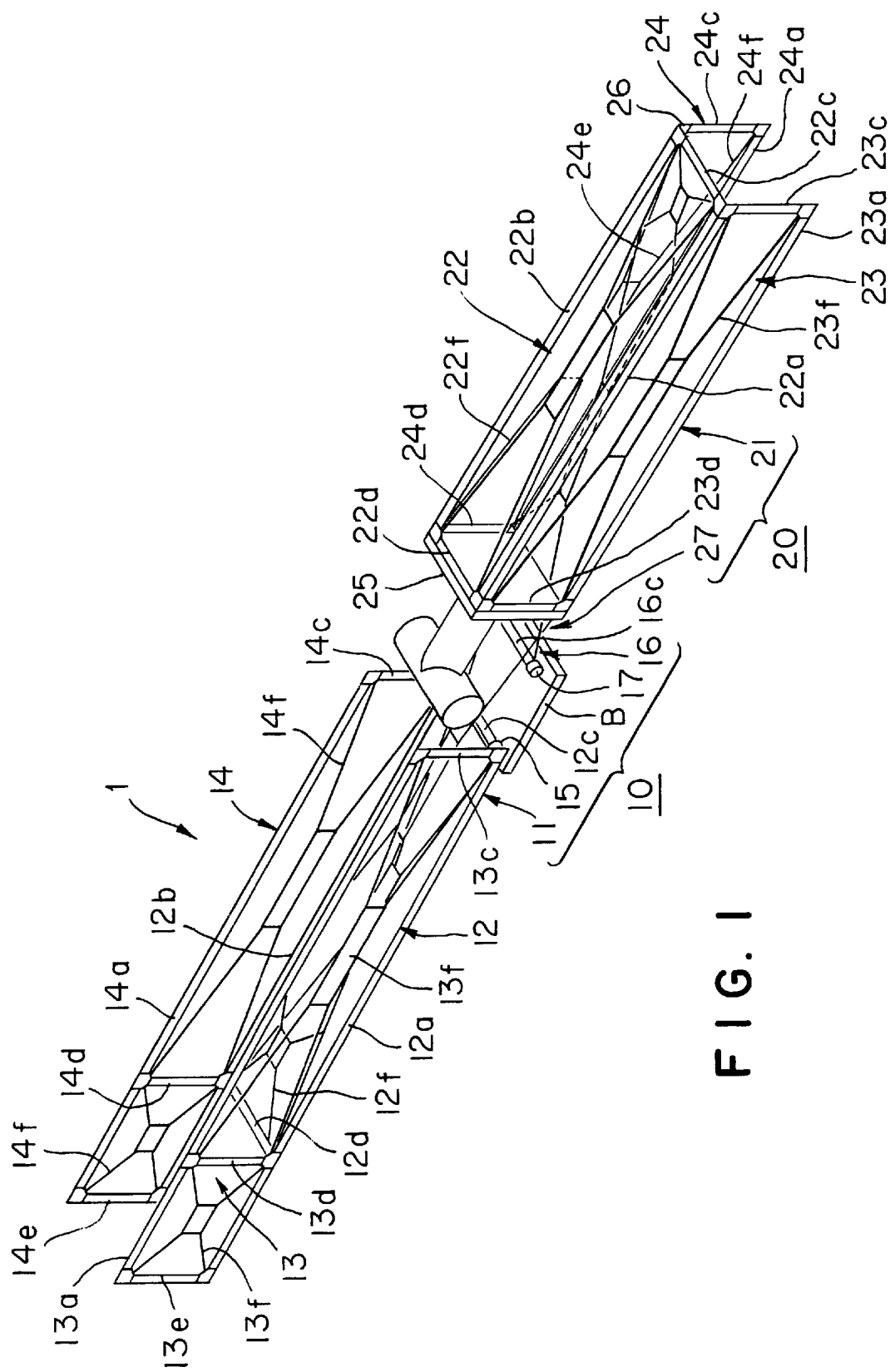
FIG. 1 is a perspective view of a collapsible structure in a first embodiment according to the present invention in a folded state.

Referring to FIG. 1, a collapsible structure 1 has a base member B, a first unit 10 and an upper unit 20. The lower unit 10 has a first side structure 11 and a second side structure 16.

As shown in FIG. 1, the first side structure 11 has a rectangular main substructure 12 formed by assembling a pair of longitudinal members 12a and 12b having base ends pivotally supported by a hinge 15 on the base member B, a lower transverse member 12c connecting the base ends of the pair of longitudinal members 12a and 12b, an intermediate transverse member 12d connecting respective middle parts of the pair of longitudinal members 12a and 12b, and a plurality of auxiliary members 12f serving as members of a trussed structure. Side substructures 13 and 14 are disposed opposite to each other and connected to the main substructure 12. The side substructure 13 has a longitudinal member 13a extended in parallel to the longitudinal member 12a, a lower transverse member 13c connecting the respective base ends of the longitudinal members 12a and 13a, a middle transverse member 13d connecting the respective middle parts of the longitudinal members 12a and 13a, an upper transverse member 13e connecting the respective upper ends of the longitudinal members 12a and 13a, and a plurality of auxiliary members 13f serving as members of a trussed structure formed in a frame of the longitudinal members 12a and 13a, the lower transverse member 13c and the middle transverse member 13d, and a trussed structure formed in a frame of the longitudinal middle members 12a and 13a, the middle transverse member 13d and the upper transverse member 13e. The side substructure 14, similarly to the side substructure 13, has a longitudinal member 14a extended in parallel to the longitudinal member 12b, a lower transverse member 14c connecting the respective base ends of the longitudinal members 12b and 14a, a middle transverse member 14d connecting the respective middle parts of the longitudinal members 12b and 14a, and an upper transverse member 14e connecting the respective upper ends of the longitudinal members 12b and 14a, and a plurality of auxiliary members 14f serving as members of a trussed structure formed in a frame of the longitudinal members 12b and 14a, the lower transverse member 14c and the middle transverse member 14d, and a trussed structure formed in a frame of the longitudinal members 12b and 14a, the middle transverse member 14d and the upper transverse member 14e.

The second side structure 16 has the shape of a trussed structure and comprises a lower transverse member 16c forming a base end of the second side structure 16 and pivotally supported on the base member B by a hinge 17 disposed opposite to the hinge 15 on the base member B, a middle transverse member 16d and a plurality of auxiliary members 16f. The length of the second side structure 16 is approximately equal to or slightly greater than that of the first side structure 11.

The upper unit 20 has a first side structure 21 and a second side structure 27. As shown in FIG. 1, the first side structure 21 comprises a main substructure 22, and side substructures 23 and 24. The side substructures 23 and 24 are disposed opposite to each other on the opposite sides of the main substructure 22 and spaced a distance that allows the second side structure 16 to swing apart from each other. The main substructure 22 has the shape of a rectangular trussed structure and comprises a pair of longitudinal members 22a and 22b extended opposite to and in parallel to each other, a lower transverse member 22c connecting the respective base ends of the longitudinal members 22a and 22b, an upper transverse member 22d connecting the respective upper ends of the longitudinal members 22a and 22b, and a plurality of auxiliary members 22f. The lower transverse member 22c is supported pivotally on the upper end of the second side structure 16 by a hinge 26. The side substructure 23 has the shape of a rectangular trussed structure and comprises a longitudinal member 23a disposed opposite to and in parallel to the longitudinal member 22a, a lower transverse member 23c connecting the respective base ends of the longitudinal members 22a and 23a, an upper transverse member 23d connecting the respective upper ends of the longitudinal members 22a and 23a, and a plurality of auxiliary members 23f. The side substructure 24, similarly to the side substructure 23, has the shape of a rectangular trussed structure and comprises a longitudinal member 24a disposed opposite to and in parallel to the longitudinal member 22b, a lower transverse member 24c connecting the respective base ends of the longitudinal members 22b and 24a, an upper transverse member 24d connecting the respective upper ends of the longitudinal members 22b and 24a, and a plurality of auxiliary members 24f. The upper transverse members 22d, 23d and 24d of the first side structure 21 are connected to an upper base member 25 for supporting a device, such as an antenna.

The second side structure 27 is formed in the shape of a trussed structure and has a lower end pivotally supported on the middle transverse member 12d of the first side structure 11 of the lower unit 10 by a hinge 28, a middle transverse member 27b, a plurality of auxiliary members 27d and an upper end pivotally connected to the upper transverse member 25d of the first side structure 21 by a hinge 29. The distance between the lower end of the second side structure 27 and the middle transverse member 27b is approximately equal to or slightly greater than the distance between the middle transverse member 12d of the first side structure 11 of the lower unit 10 and the upper end of the first side structure 11 of the lower unit 10. The distance between the middle transverse member 27b and the upper end of the second side structure 27 is approximately equal to or slightly greater than the length of the first side structure 21.

Figure 2:
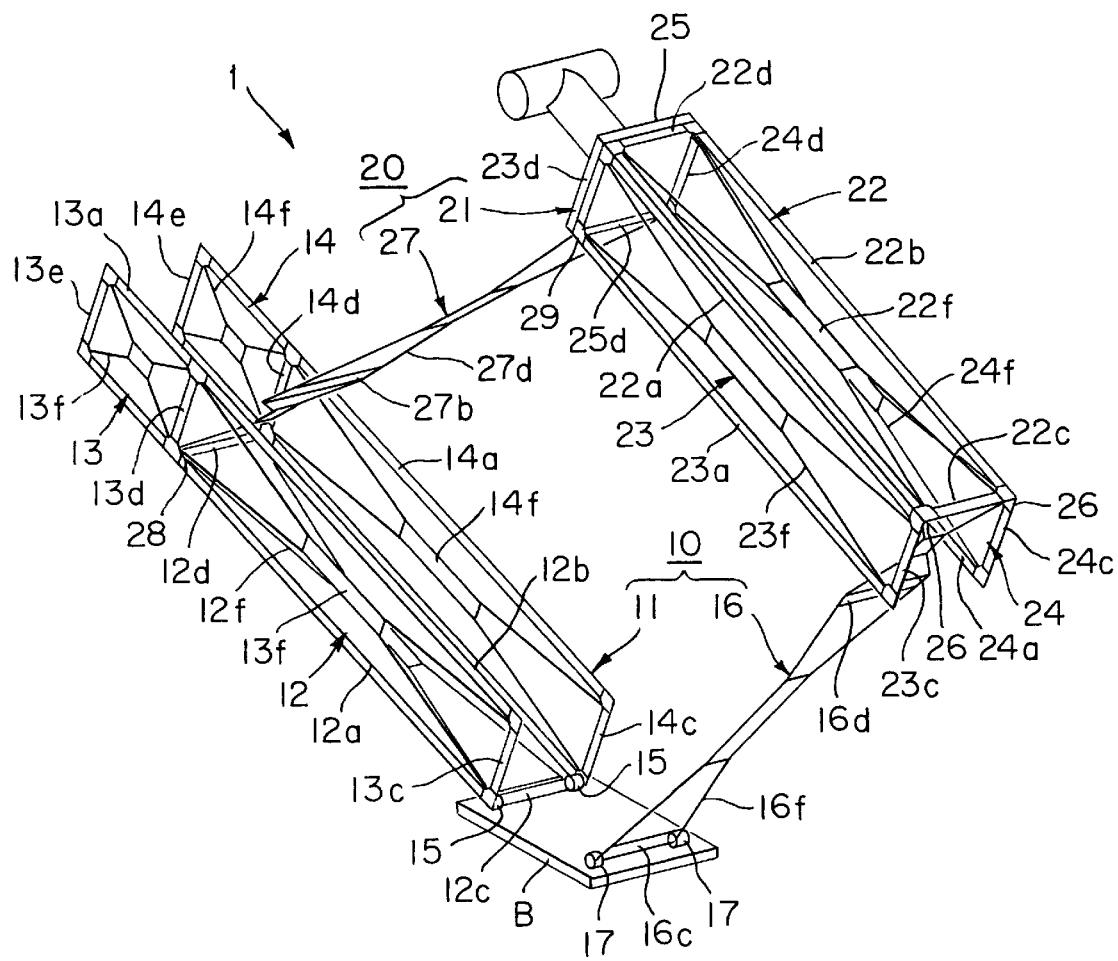
FIG. 2 is a perspective view of the collapsible structure of FIG. 1 in an intermediate state between the folded state and an unfolded state.
Figure 4:
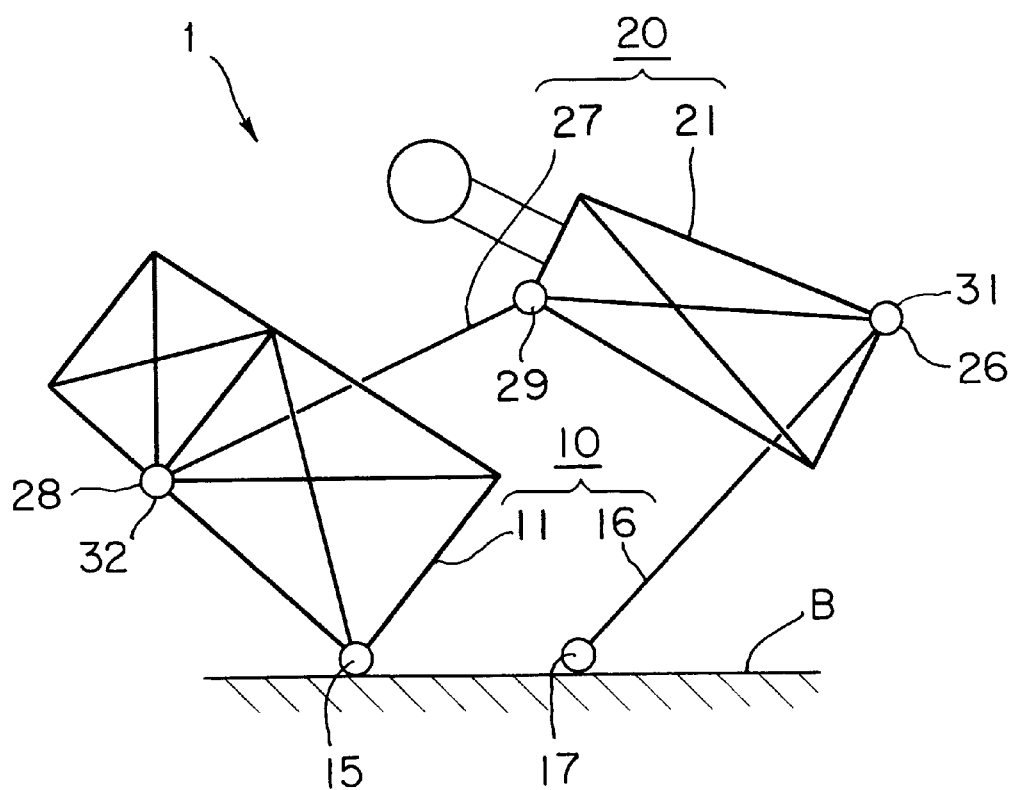
FIG. 4 is a diagrammatic view of assistance in explaining a process of unfolding the collapsible structure of FIG. 1.

A coil spring 31 (see FIG. 4), i.e., an actuator for biasing the second side structure 16 in a counterclockwise direction, as viewed in FIGS. 2 and 4, is disposed between the lower end of the first side structure 21 of the upper unit 20 and the upper end of the second side structure 16 of the lower unit 10 pivotally joined to the former by the hinge 26. A coil spring 32 (see FIG. 4) for biasing the second side structure 27 in a counterclockwise direction is interposed between the middle transverse member 12d of the first side structure 11 and the second side structure 27 of the upper unit 20 pivotally connected to the former by the hinge 28.

The collapsible structure 1 is provided with a plurality of locking mechanisms 35 for fixedly joining together the upper end of the lower unit 10 and the lower end of the upper unit 20.

Figure 5A:
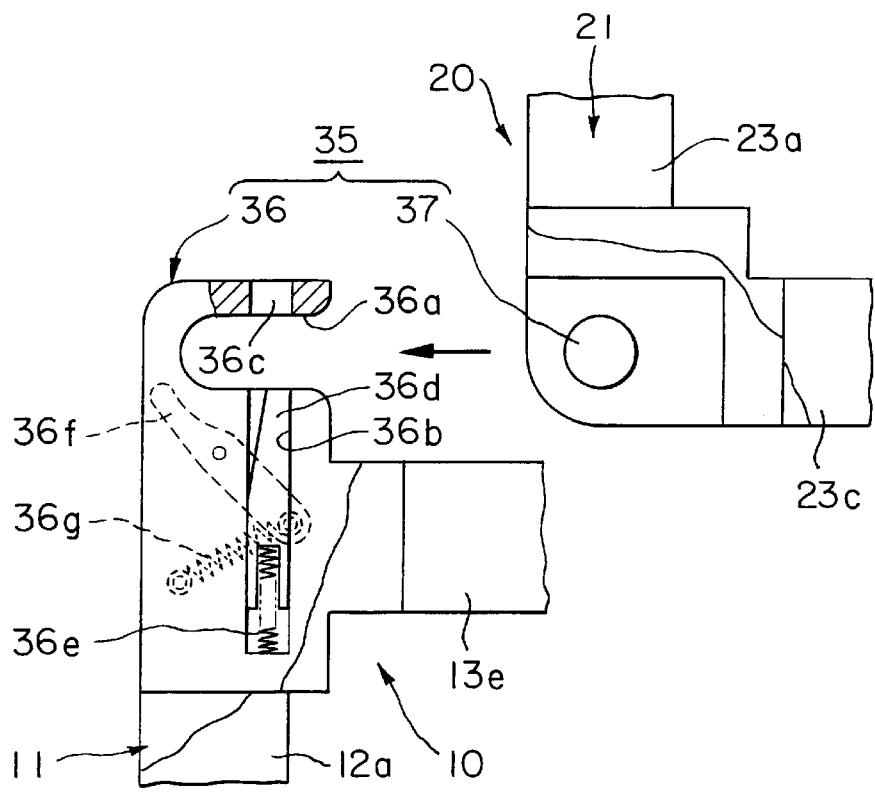
FIGS. 5A and 5B are front views of a locking mechanism included in the collapsible structure of FIG. 1.
Figure 5B:
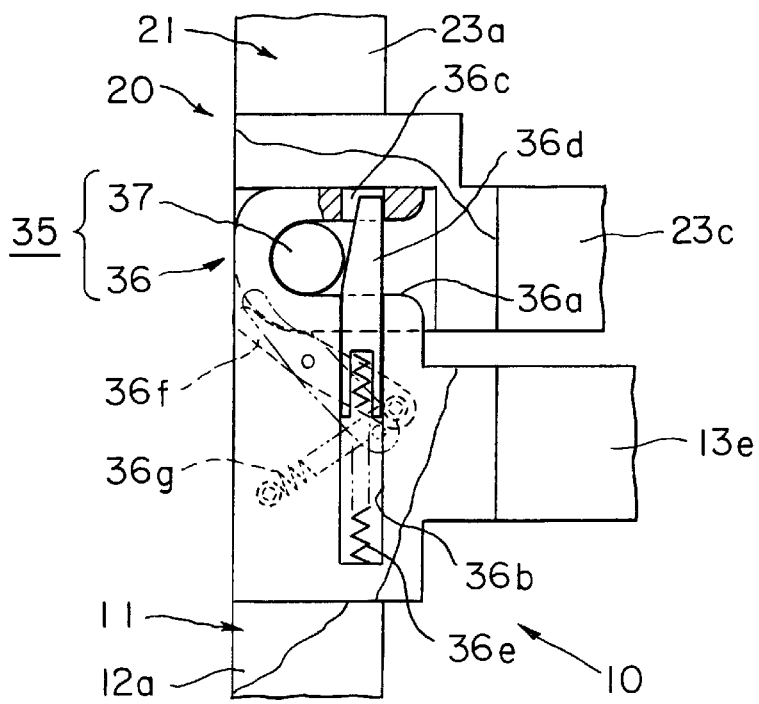

Referring to FIGS. 5A and 5B illustrating the locking mechanism 35 in an unlocking state and in a locking state, respectively, the locking mechanism 35 has a locking unit 36 attached to an upper end part of the longitudinal member 12a of the first side structure 11 of the lower unit 10, and a pin 37 supported on a lower end part of the longitudinal member 23a of the first side structure 21 of the upper unit 20. The locking unit 36 has a member projecting from the first side structure 11 of the lower unit 10 and provided with a groove 36a extending substantially in parallel to the upper transverse member 13e, and locking pin receiving holes 36b and 36c formed coaxially opposite to each other on the opposite sides of the groove 36a, respectively, a locking pin 36d axially slidably fitted in the locking pin receiving hole 36b, a spring 36e biasing the locking pin 36d outward of the locking pin receiving hole 36b, a latch 36f capable of being turned between a locking pin retaining position where the latch 36f is engaged with the locking pin 36d to retain the locking pin 36d at a retracted position and a locking pin releasing position where the latch 36f is disengaged from the locking pin 36d to allow the locking pin 36d to project from the locking pin receiving hole 36b to a locking position, and a spring 36g biasing the latch 36f toward the locking pin holding position.

In a state shown in FIG. 5A, in which the locking pin 36d is retained at the retracted position in the locking pin receiving hole 36b by the latch 36f, the first side structure 21 is moved and the pin 37 is inserted into the groove 36a of the locking unit 36. As the pin 37 is advanced toward the depth of the groove 36a, the lower end of the first side structure 21 turns the latch 36f against the resilience of the spring 36g to disengage the latch 36f from the locking pin 36d as shown in FIG. 5B. Consequently, the locking pin 36d is pushed outward by the spring 36e, the outer end part of the locking pin 36d is inserted into the locking pin receiving hole 36c to hold the pin 37 in the groove 36a by the locking pin 36d.

As shown in FIG. 1, in the collapsible structure 1 thus constructed, the first side structure 11 and the second side structure 16 of the lower unit 10 pivotally supported by the hinges 15 and 17 on the base member B are laid down in opposite directions substantially in a straight line so that the upper ends thereof are apart from each other, the first side structure 21 of the upper unit 20 is laid down on the second side structure 16 with its upper end disposed on the side of the base member B, and the second side structure 27 of the upper unit 20 is laid down between the side substructure 13 and the side substructure 14 of the first side structure 11 of the lower unit 10. Thus, the collapsible structure 1 can be folded in a flat shape and can be stored in a space having a limited height. The collapsible structure folded in the shape shown in FIG. 1 and bound by binding devices, not shown, is transported into outer space, and the binding devices are removed. Then, the coils springs 31 turns the first side structure 21 clockwise on the hinge 26 relative to the second side structure 16, and the coil spring 32 turns the second side structure 27 counterclockwise on the hinge 28 relative to the first side structure 11. Then, as shown in FIG. 2, the fist side structure 11 turns gradually clockwise, as viewed in FIG. 2 on the hinge 15, the second side structure 16 turns gradually counterclockwise, as viewed in FIG. 2, on the hinge 17, and the first side structure 11 and the second side structure 16 of the lower unit 10, and the first side structure 21 and the second side structure 27 of the upper unit 20 approach each other gradually. The second side structure 16 is fitted in a space between the longitudinal members 13a and 14a of the side substructure 13 and the side substructure 14 of the first side structure 11 of the lower unit 10 to complete the lower unit 10 having a substantially rectangular cross section. The second side structure 27 passes the space between the side substructure 13 and the side substructure 14 and is fitted in a space between parts of the longitudinal members 12a and 12b extending above the middle transverse member 12d, and a space between the longitudinal members 23a and 23b of the second side structure 27 to complete the upper unit 20 having a substantially rectangular cross section.

Figure 3:
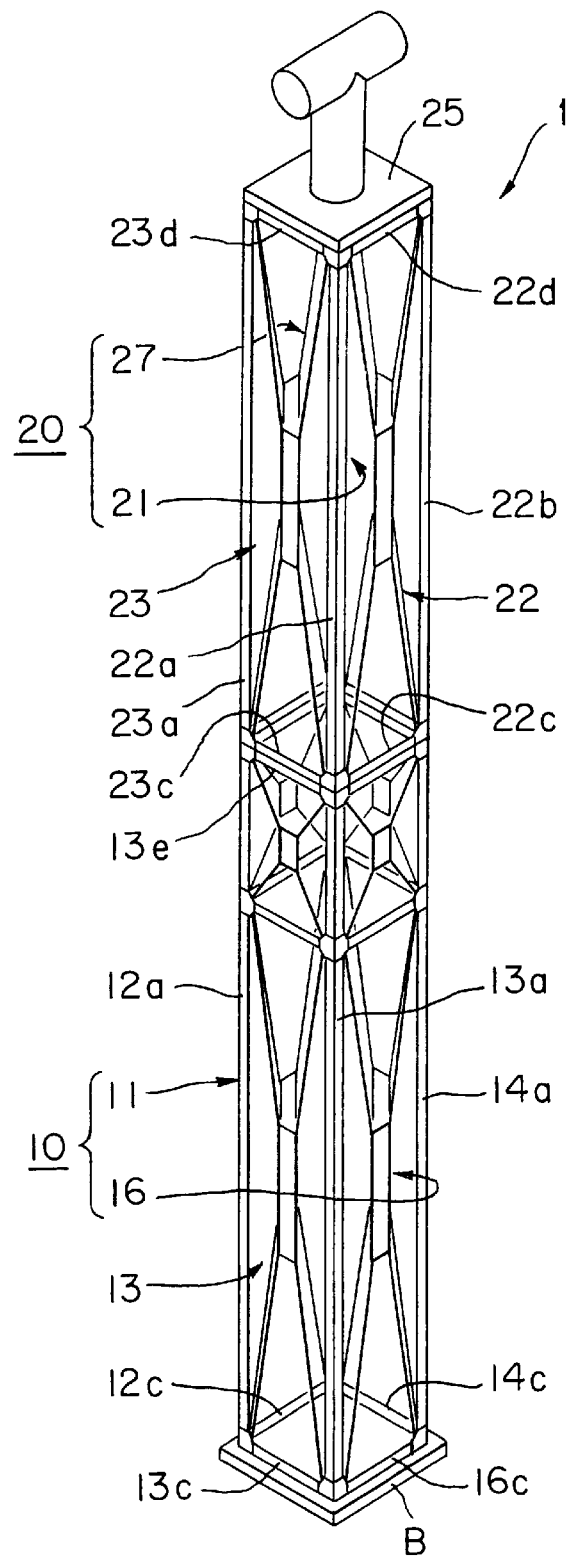
FIG. 3 is a perspective view of the collapsible structure of FIG. 1 in the unfolded state.

Consequently, the collapsible structure 1 is unfolded as shown in FIG. 3, in which the lower unit 10 is set up on the base member B, the upper unit 20 is joined to the upper end of the lower unit 10, and the upper end of the lower unit 10 and the lower end of the upper unit 20 are fixedly held together by the locking mechanisms 35 to maintain the collapsible structure 1 in the unfolded state.

The collapsible structure 1 in the first embodiment is provided with the coil springs 31 and 32 as actuators. One of the coil springs 31 and 32 may be omitted, and the coil springs may be interposed between the first side structure 21 and the second side structure 27 of the upper unit 20. Motors or other driving devices may be employed instead of the coil springs. If reversible motors are employed instead of the coil springs 31 and 32, and controllable locking mechanisms are employed instead of the locking mechanism 35, the folded collapsible structure 1 can be unfolded, and the unfolded collapsible structure 1 can be folded. The controllable locking mechanism can be constructed, for example, by forming recesses in the locking pin 36d, combining, with the locking pin 36d, a retaining device provided with a ball or the like capable of pressed by a spring or the like so as to drop in the recess of the locking 36d and capable of positioning and retaining the locking pin 36d at the retracted position or the locking position, and driving the locking pin 36d for movement between the retracted position and the locking position by a solenoid actuator or the like.

Second Embodiment

A collapsible structure 50 in a second embodiment according to the present invention will be described with reference to FIGS. 6A to 6D, 7A to 7D, 8A and 8B, in which circles represent hinges for pivotally connecting components. The collapsible structure in the second embodiment is the same in basic construction as the collapsible structure in the first embodiment and hence the descriptions of parts like or corresponding to those of the collapsible structure in the first embodiment will be omitted.

The collapsible structure 50 has a lower unit 51 and an upper unit 54. The lower unit 51 has a first side structure 52 and a second side structure 53. The first side structure 52 has a main substructure 52A having a lower end 52Aa hinged to a base member B, and second and side substructures 52B hinged to the opposite side edges of the main substructure 52A, respectively.

The upper unit 54 has a first side structure 55, a second side structure 56, and a top member 57. The first side structure 55 has a main substructure 55A having a lower end 55Aa hinged to an upper end 53b of the second side structure 53 of the lower unit 51, and second and side substructures 55B hinged to the opposite side edges of the main substructure 55A.

The second side structure 56 has a lower end 56a hinged to the upper end 52Ab of the main substructure 52A, and an upper end 56b connected to the top member 57, to which the upper end 55Ab of the main substructure 55A are connected.

The collapsible structure 50, similarly to the collapsible structure 1 in the first embodiment, is provided with locking mechanisms, not shown, for joining together the upper end of the lower unit 51 and the upper unit 54, and actuators, such as motors, not shown, for varying the angles between the main substructure 52A and the second and the side substructures 52B of the lower unit 51; the main substructure 55A and the second and the side substructure 55B of the upper unit 54; the main substructure 52A of the lower unit 51 and the second side structure 56 of the upper unit 64; the second side structure 53 of the lower unit and the main substructure 55A of the upper unit 54, which are connected by hinges, respectively.

As shown in FIGS. 6A and 7A, the collapsible structure 50 thus constructed is folded in a flat shape for storage with the main substructure 52A and the side substructure 52B of the first side structure 52 of the lower unit 51 laid down flat, the main substructure 55A and the side substructures 55B of the first side structure 55 of the upper unit 54 laid down flat, and the second side structure 56 and the first side structure 55 of the upper unit 54 laid down on the first side structure 52 and the second side structure 53 of the lower unit 51, respectively.

Figure 7C:
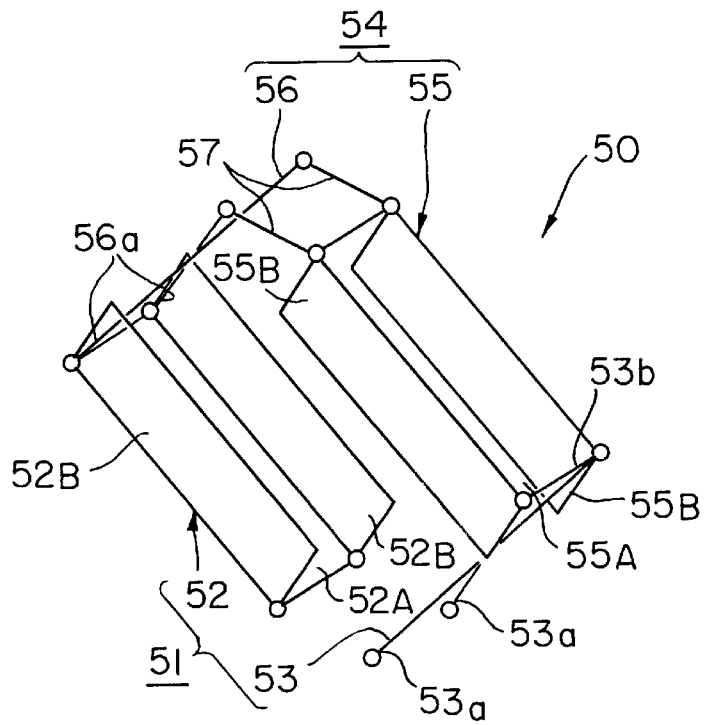
Figure 7D:
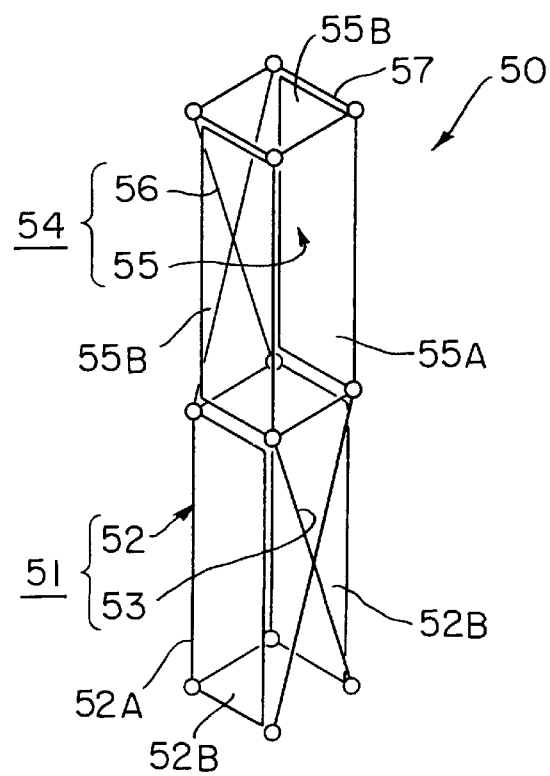

When unfolding the collapsible structure 50, the motors are actuated to set up the second side structure 56 of the upper unit 54, and the second side structure 53 of the lower unit 51 on the base member B, to separate the first side structure 55 of the upper unit 54 from the base member B, to turn the side substructures 52B of the first side structure 52 of the lower unit 51 away from the base member B so as to extend substantially perpendicularly to the main substructure 52A, and to turn the side substructure 55B of the first side structure 55 of the upper unit 54 toward the base member B so as to extend substantially perpendicularly to the main substructure 55A as shown in FIGS. 6B and 7B. Subsequently, the motors turn the first side structure 55 clockwise on the hinge relative to the second side structure 53, and turn the second side structure 56 counterclockwise on the hinge relative to the first side structure 52. As the first side structure 55 and the second side structure 56 are thus turned, the first side structure 52 hinged to the base member B turns on the hinge so as to stand gradually on the base member B, and the second side structure 53 hinged to the base member B turns on the hinge so as to stand gradually on the base ember B as shown in FIGS. 6C and 7C. Consequently, the first side structure 52 and the second side structure 53 of the lower unit 51, and the first side structure 55 and the second side structure 56 of the upper unit 54 approach gradually each other, respectively. The second side structure 53 is fitted in a space between the side edges of the side substructure 52B of the first side structure 52 to complete the lower unit 51 having a substantially rectangular cross section. The second side structure 56 is fitted in a space between the side edges of the side substructures 55B of the first side structure 55 to complete the upper unit 54 having a substantially rectangular cross section. The upper end of the upper unit 54 is covered with the top member 57, the lower unit 51 is set up on the base member B, the lower end of the upper unit 54 is joined to the upper end of the lower unit 51, and the lower end of the upper unit 54 and the upper end of the lower unit 51 are locked together by locking mechanisms to hold the collapsible structure 50 in an unfolded state as shown in FIGS. 6D and 7D. When folding the collapsible structure 50, the locking mechanisms are unfastened to disconnect the lower unit 51 and the upper unit 54 from each other and the foregoing unfolding procedure is reversed.

As shown in FIGS. 6A and 7A, the collapsible structure 50 is folded in a flat shape with the main substructure 52A and the side substructure 52B of the first side structure 52 of the lower unit 51 laid down flat, and the main substructure 55A and the side substructures 55B of the first side structure 55 of the upper unit 54 laid down flat. In contrast, the area of a space necessary for storing the folded collapsible structure 50 can be reduced by pivotally connecting the members 52Ba, 52Bb and 52Bc of the side substructures 52B of the first side structure 52 in a parallel-link structure, pivotally connecting the members 55Ba, 55Bb and 55Bc of the side substructure 55B of the first side structure 55 in a parallel-link structure, and folding the members 52Ba, 52Bb, 52Bc, 55Ba, 55Bb and 55Bc of the side substructures 52B and 55B so as to extend along the side edges of the main substructures 52A and 55A, respectively, as shown in FIG. 8A and to be extended as shown in FIG. 8B when the collapsible structure 50 is unfolded.

If a relatively large space is available for storing the collapsible structure 50, the first side structure 52 of the lower unit 51 may be constructed by fixedly connecting the side substructures 52B to the main substructure 52A so as to extend perpendicularly to the main substructure 52A away from the base member B, and the first side structure 55 may be constructed by fixedly connecting the side substructures 55B to the main substructure 55A so as to extend perpendicularly to the main substructure 55A toward the base member B to simplify the construction of the collapsible structure 50 by reducing the number of pivot joints. If the collapsible structure 50 is thus constructed, the collapsible structure 50 is stored in a shape shown in FIGS. 6B and 7B. The collapsible structure 50 is unfolded via an intermediately unfolded state shown in FIGS. 6C and 7C in an unfolded state shown in FIGS. 6D and 7D by turning the first side structure 55 of the upper unit 54 clockwise relative to the second side structure 53 by the motor, and turning the second side structure 56 of the upper unit 54 counterclockwise relative to the first side structure 52 by the motor. In the unfolded state shown in FIGS. 6D and 7D, the lower unit 51 is set up on the base member B, the lower end of the upper unit 54 is joined to the upper end of the lower unit 51, and the lower end of the upper unit 54 and the upper end of the lower unit 51 are locked together by the locking mechanisms. When folding the collapsible structure 50, the locking mechanisms are unfastened to disconnect the lower unit 51 and the upper unit 54 from each other and the foregoing unfolding procedure is reversed.

Third Embodiment

Figure 9C:
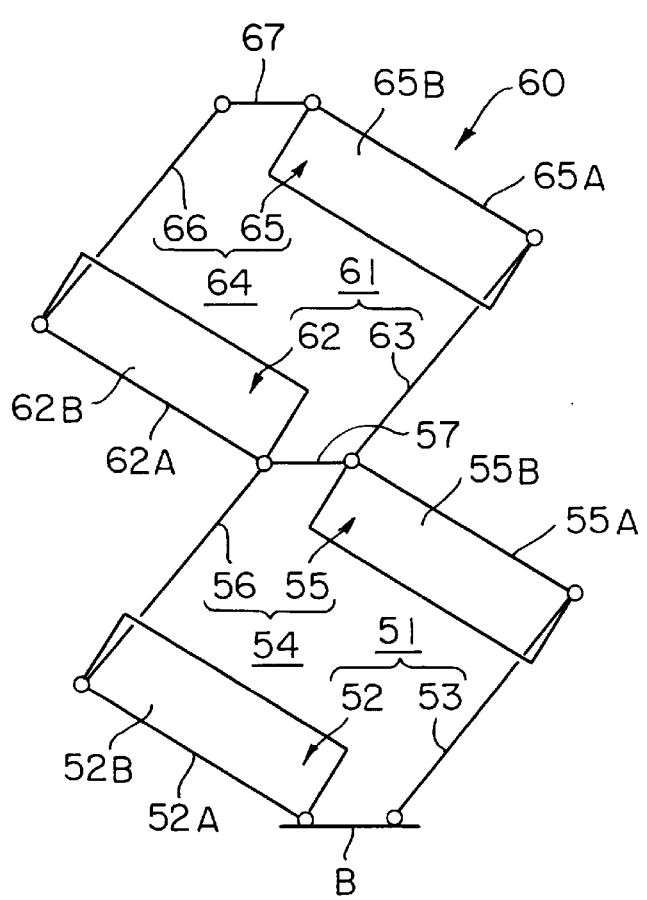
Figure 9D:
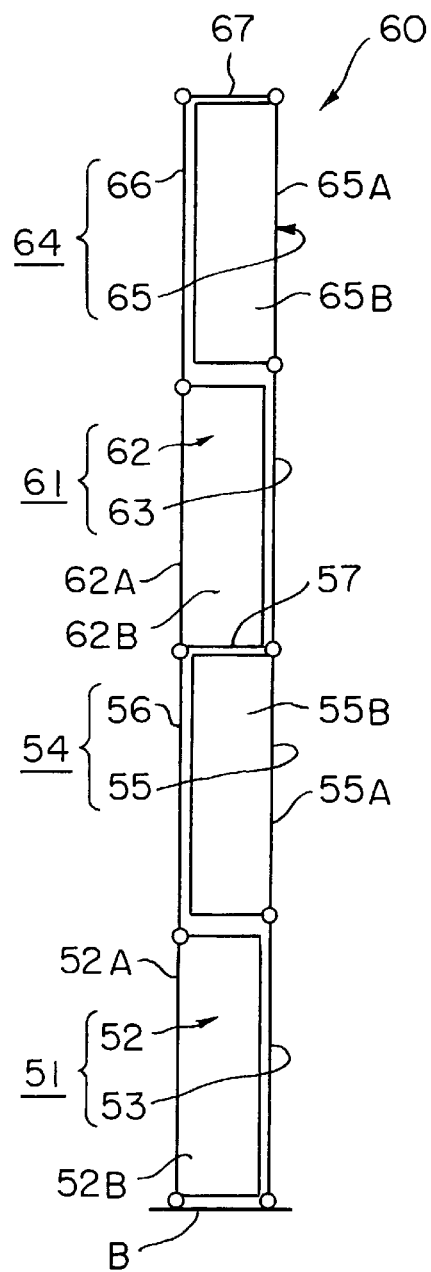

A collapsible structure 60 in a third embodiment according to the present invention will be described with reference to FIGS. 9A to 9D and 10A to 10D, in which parts like or corresponding to those of the collapsible structure 50 illustrated in FIGS. 6A to 6D and 7A to 7D are designated by the same reference characters and the description thereof will be omitted. FIG. 9A shows the collapsible structure 60 in a folded state, FIGS. 9B and 9C show the collapsible structure 60 at different stages of an unfolding process, and FIG. 9D shows the collapsible structure 60 in an unfolded state. FIGS. 10A to 10D are diagrammatic perspective views respectively corresponding to diagrammatic views shown in FIGS. 9A to 9D.

The collapsible structure 60 comprises a first lower unit 51, a first upper unit 54, a second lower unit 61, and a second upper unit 64.

The lower unit 51, similarly to the lower unit 51 of the second embodiment, has a first side structure 52 comprising a main substructure 52A having a lower end hinged to a base member B, and side substructures 52B hinged to the opposite side edges of the main substructure 52A, and a second side structure 53.

The first upper unit 54 has a first side structure 55 comprising a main substructure 55A having a lower end hinged to the upper end of the second side structure 53, and side substructures 55B hinged to the opposite side edges of the main substructure 55A, and a second side structure 56 having a lower end hinged to the lower end of the main substructure 52A of the first side structure 52. A top member 57 is hinged to the respective upper ends of the second side structure 56 and the main substructure 55A of the first upper unit 54.

The second upper unit 61 has a first side structure 62 and a second side structure 63. The first side structure 62 has a main substructure 62A having a lower end hinged together with the top member 57 on the upper end of the second side structure 56 of the first upper unit 54, and side substructures 62B hinged to the opposite side edges of the main substructure 62A. The second side structure 63 has a lower end hinged for pivotal motion to the upper end of the main substructure 55A of the first lower unit 54.

The second upper unit 64 has a first side structure 65, a second side structure 66 and a top member 67. The first side structure 65 comprises a main substructure 65A having a lower end hinged to the upper end of the second side structure 63 of the second lower unit 61, and side substructures 65B hinged to the opposite side edges of the main substructure 65A, respectively. The lower end of the second side structure 66 is hinged to the upper end of the main substructure 62A of the second lower unit 61, and the respective upper ends of the second side structure 66 and the main substructure 65A of the second upper unit 64 are hinged to the top member 67.

The first lower unit 51 and the first upper unit 54; the first upper unit 54 and the second lower unit 61; and the second lower unit 61 and the second upper unit 64 can be respectively locked together by locking mechanisms, not shown. The respective angles between the main substructure 52A, and the side substructure 52B of the first lower unit 51; between the main substructure 55A, and the side substructure 55B of the first upper unit 54; between the main substructure 62A, and the side substructures 62B of the second lower unit 61; between the main substructure 65A, and the side substructures 65B of the second upper unit 64; between the main substructure 52A of the first lower unit 51 and the second side structure 56 of the first upper unit 54; between the second side structure 53 of the first lower unit 51 and the main substructure 55A of the first upper unit 54; between the main substructure 62A of the second lower unit 61 and the second side structure 66 of the second upper unit 64; between the main substructure 65A of the second upper unit 64 and the second side structure 63 of the second lower unit 61 are varied by actuators, such as motors, not shown, disposed at the respective hinged joints of those components.

As shown in FIGS. 9A and 10A, the collapsible structure 60 is folded in a flat shape with the respective side substructures 52B, 55B, 62B and 65B of the first lower unit 51, the first upper unit 54, the second lower unit 61 and the second upper unit 64 extended in planes including the corresponding main substructures 52A, 55A, 62A and 65A, and the second side structure 56 and the first side structure 55 of the first upper unit 54, the first side structure 62 and the second side structure 63 of the second lower unit 61, and the second side structure 66 and the first side structure 65 of the second upper unit 64 stacked in that order on the first side structure 52 and the second side structure 53 of the lower unit 51.

When unfolding the collapsible structure 60, the motors are actuated to set up the second side structure 56 of the first upper unit 54, and the second side structure 53 of the first lower unit 51 on the base member B, to move the first side structure 55 of the first upper unit 54 away from the base member B. The motors are also actuated to set up the second side structure 66 of the second upper unit 64, and the second side structure 63 of the second lower unit 61, and to move the first side structure 65 of the second upper unit 64 away from the first upper unit 54 as shown in FIGS. 9B and 10B. Furthermore, the side substructures 52B of the first side structure 52 are turned away from the base member B so as to extend substantially perpendicularly to the main substructure 52A, and the side substructures 55B of the first side structure 55 of the first upper unit 54 are turned toward the base member B so as to extend substantially perpendicularly to the main substructure 55A. Similarly, the side substructures 62B of the second lower unit 61 are turned away from the base member B so as to extend substantially perpendicularly to the main substructure 62A, and the side substructures 65B of the first side structure 65 of the second upper unit 64 are turned toward the base member B so as to extend substantially perpendicularly to the main substructure 65A. Subsequently, the motors turn the first side structure 55 clockwise relative to the second side structure 53, and turn the second side structure 56 counterclockwise relative to the first side structure 52. Similarly, the motors turn the first side structure 65 clockwise relative to the second side structure 63, and turn the second side structure 66 counterclockwise relative to the first side structure 62.

Figure 10C:
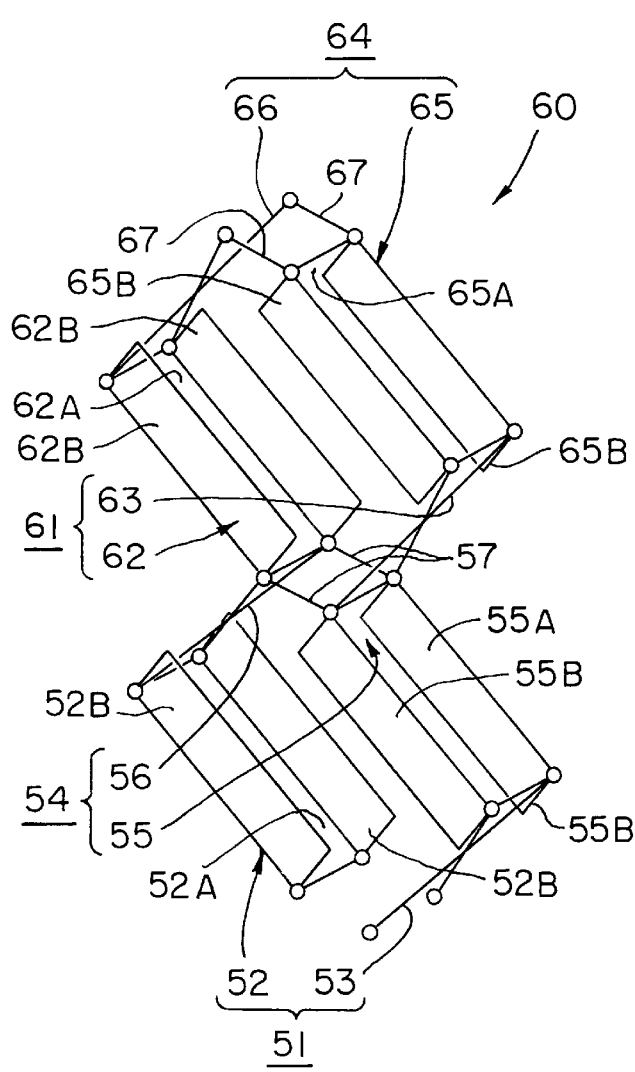

As shown in FIGS. 9C and 10C, the first side structure 52 and the second side structure 53 of the first lower unit 51 are thus turned on the base member B so as to stand gradually on the base member B, and the first side structure 52 and the second side structure 53 of the first lower unit 51, and the first side structure 55 and the second side structure 56 of the first upper unit 54 approach gradually each other, respectively. Similarly, the first side structure 62 of the second lower unit 61 hinged to the second side structure 56 of the first upper unit 54 stands up gradually, the second side structure 63 of the second lower unit 61 hinged to the first side structure 55 of the first upper unit 54 turns and stands up gradually, and the first side structure 62 and the second side structure 63 of the second lower unit 61, and the fist side structure 65 and the second side structure 66 of the second upper unit 64 approach gradually each other, respectively. Consequently, as shown in 9D and 10D, the second side structure 53 of the first lower unit 51 is fitted in a space between the side edges of the side substructures 52B of the first side structure 52 of the first lower unit 51, the second side structure 56 of the first upper unit 54 is fitted in a space between the side substructures 55B of the first side structure 55 of the first upper unit 54, and the upper end of the first upper unit 54 is covered with the top member 57.

Figure 10D:
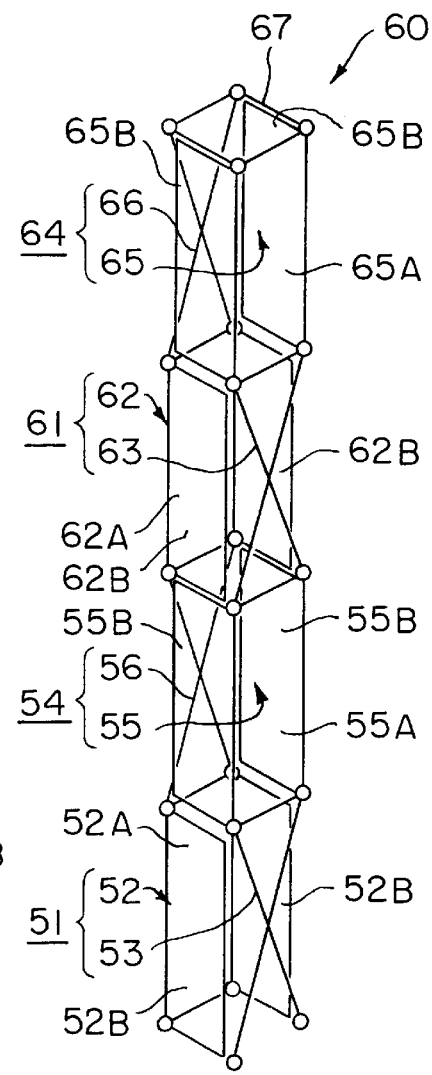

In the second lower unit 61, the second side structure 63 is fitted in a space between the side edges of the side substructures 62B of the first side structure 62. In the second upper unit 64, the second side structure 66 is fitted in a space between the side edges of the side substructures 65B of the first side structure 65. The upper end of the second upper unit 64 is covered with the top member 67. The first lower unit 51 is set up on the base member B, and the first lower unit 51, the first upper unit 54, the second lower unit 61, and the second upper unit 64 are connected in that order in a row as shown in FIGS. 9D and 10D. The first lower unit 51 and the first upper unit 54; the first upper unit 54 and the second lower unit 61; and the second lower unit 61; and the second upper unit 64 are respectively joined and locked together by locking mechanisms to complete the unfolded collapsible structure 60. When folding the collapsible structure 60, the locking mechanisms are unfastened to disconnect the first lower unit 51 from the first upper unit 54, the second lower unit 61 from the first upper unit 54 and the second upper unit 64 from the second lower unit 61, and the foregoing unfolding procedure is reversed.

If a relatively large space is available for storing the collapsible structure 60, the side substructures 52B, 55B, 62B and 65B may be fixed to the main substructures 52A, 55A, 62A and 65A so as to extend perpendicularly to the main substructures 52A, 55A, 62A and 65A, respectively, to simplify the construction of the collapsible structure 60 by reducing the number of pivot joints. If the collapsible structure 60 is thus constructed, the same is stored in a shape illustrated in FIGS. 9B and 10B.

An additional upper unit may be connected to the first side structure 65 and the second side structure 66 of the second upper unit 64 to provide a collapsible structure comprising an increased number of upper units.

Fourth Embodiment

Figures 11A, 11B, 11C:
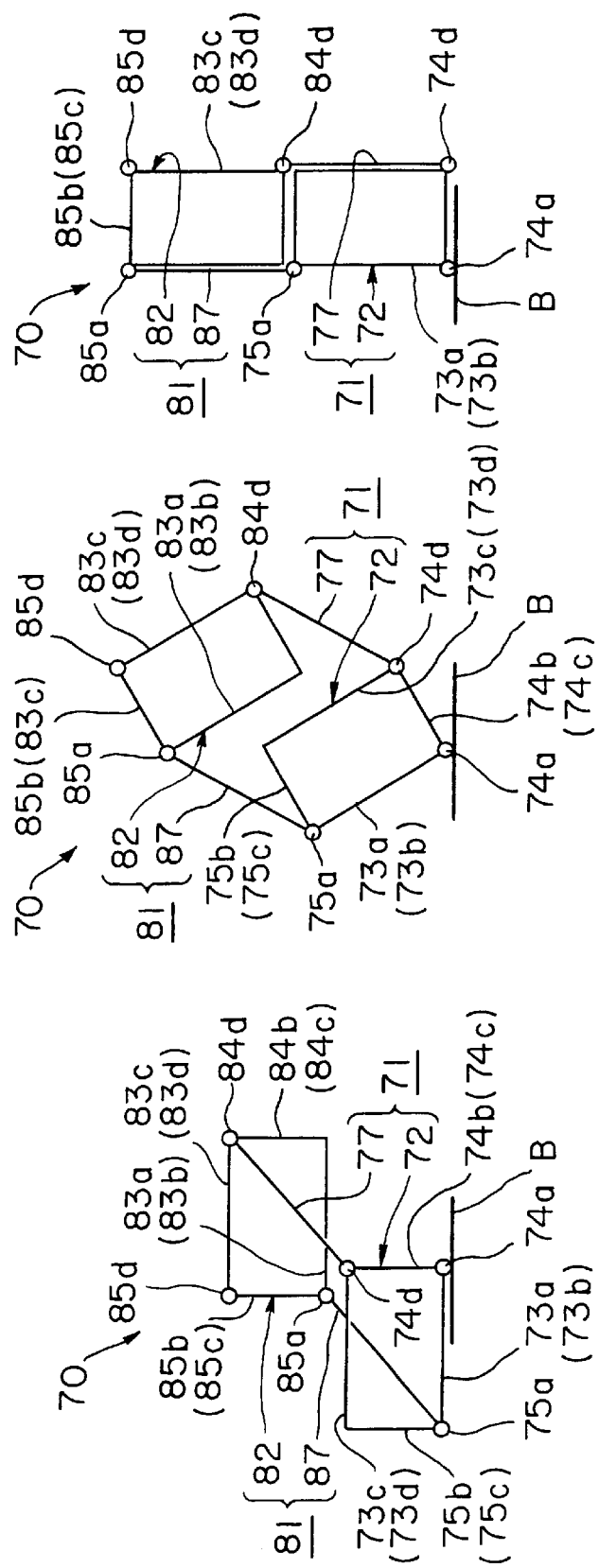
FIGS. 11A, 11B and 11C are diagrammatic views of assistance in explaining a collapsible structure in a fourth embodiment according to the present invention.
Figure 12C:
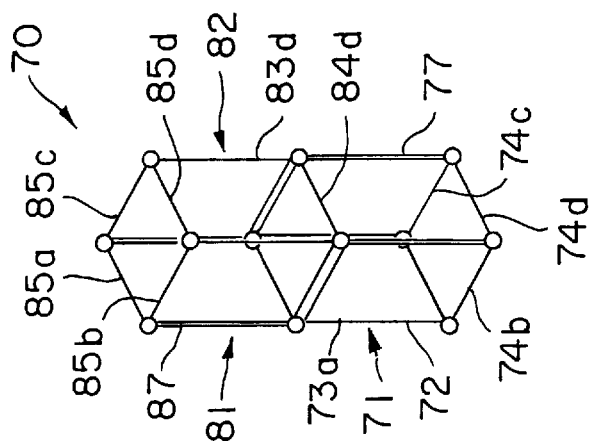
FIGS. 12A, 12B and 12C are diagrammatic perspective views respectively corresponding to FIGS. 11A, 11B and 11C.
Figure 12B:
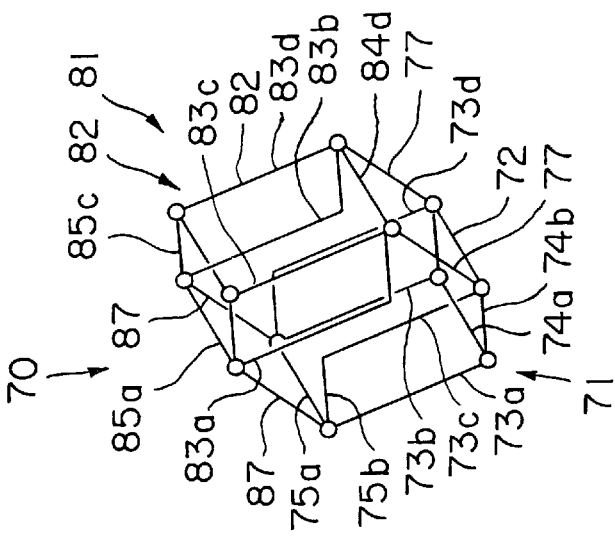
Figure 12A:
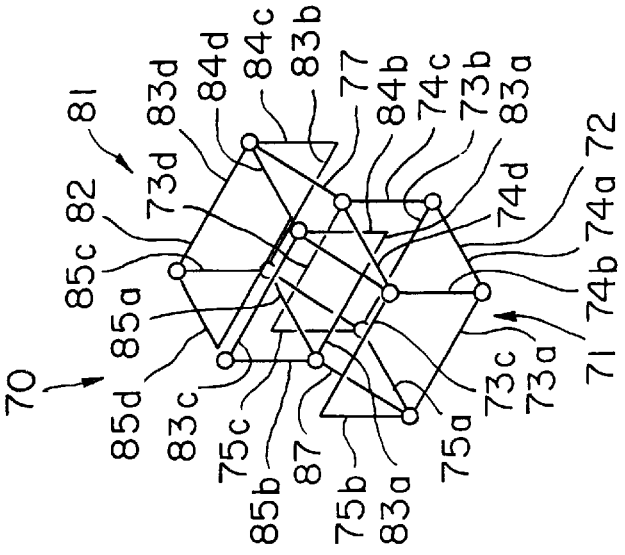

A collapsible structure 70 in a fourth embodiment according to the present invention will be described with reference to FIGS. 1A to 1C and 12A to 12C. FIG. 11A shows the collapsible structure 70 in a folded state, FIG. 11B shows the collapsible structure 70 in an unfolding process, and FIG. 11C shows the collapsible structure 70 in an unfolded state. FIGS. 12A to 12C are diagrammatic perspective views respectively corresponding to diagrammatic views shown in FIGS. 11A to 11C.

The collapsible structure 70 has a lower unit 71 and an upper unit 81. The lower unit 71 has a first side structure 72 and a second side structure 77. The first side structure 72 is formed in the shape of a box and comprises four longitudinal members, i.e., a first longitudinal member 73*a*, a second longitudinal member 73*b*, a third longitudinal member 73*c* and a fourth longitudinal member 73*d*, four lower transverse members connected to the lower ends of the longitudinal members 73*a*, 73*b*, 73*c* and 73*d*, i.e., a first lower transverse member 74*a*, a second lower transverse member 74*b*, a third lower transverse member 74*c* and a fourth lower transverse member 74*d*, a first upper transverse member 75*a* connecting the respective upper ends of the longitudinal members 73*a* and 73*b*, a second upper transverse member 75*b* connecting the respective upper ends of the longitudinal members 73*a* and 73*c*, and a third upper transverse member 75*c* connecting the respective upper ends of the longitudinal members 73*b* and 73*d*. The first lower transverse member 74*a* is hinged to a base member B.

The second side structure 77 has a length approximately equal to the distance between the fourth lower transverse member 74*d* and the upper end of the lower unit 71, and the lower end of the second side structure 77 is hinged to the fourth lower transverse member 74*d*.

The upper unit 81 has a first side structure 82 and a second side structure 87. The first side structure 82 is formed in the shape of a box and comprises four longitudinal members, i.e., a first longitudinal member 83*a*, a second longitudinal member 83*b*, a third longitudinal member 83*c* and a fourth longitudinal member 83*d*, a first lower transverse member 84*b* connecting the respective lower ends of the longitudinal members 83*a* and 83*c*, a second lower transverse member 84*c* connecting the respective lower ends of the longitudinal members 83*b* and 83*d*, a third lower transverse member 84*d* connecting the respective lower ends of the longitudinal members 83*c* and 83*d*, a first upper transverse member 85*a* connecting the respective upper ends of the longitudinal members 83*a* and 83*b*, a second upper transverse member 85*b* connecting the respective upper ends of the longitudinal members 83*a* and 83*c*, a third upper transverse member 85*c* connecting the respective upper ends of the longitudinal members 83*b* and 83*d*, and a fourth upper transverse member 85*d* connecting the respective upper ends of the longitudinal members 83*c* and 83*d*. The fourth lower transverse member 84*d* is hinged to the upper end of the second side structure 77 of the lower unit 71.

The second side structure 87 has a length approximately equal to the distance between the first upper transverse member 85*a* and the lower end of the upper unit 81. The upper end of the second side structure 87 is hinged to the first upper transverse member 85*a*, and the lower end of the same is hinged to the first upper transverse member 75*a* of the first side structure 72 of the lower unit 71.

The upper end of the lower unit 71 and the lower end of the upper unit 81 are joined and locked together by locking mechanisms, not shown. Actuators, such as motors, not shown, are combined with the joints of the first lower transverse member 74*a* of the lower unit 71 and the base B, the fourth lower transverse member 74*d* and the second side structure 77, and the first upper transverse member 75*a* and the second side structure 87 of the upper unit 81 to vary angles between the corresponding members joined through the joints by driving the joints.

When storing the collapsible structure 70, the collapsible structure 70 is folded as shown in FIGS. 11A and 12A with the first side structure 72 of the lower unit 71 laid down on the base member B, and the first side structure 82 of the upper unit 81 laid down on the first side structure 72 of the lower unit 71. When unfolding the collapsible structure 70, the first side structure 72 of the lower unit 71 is turned on the first lower transverse member 74*a* to a standing position, and the second side structure 77 of the lower unit 71, and the second side structure 87 of the upper unit 81 are turned counterclockwise as shown in FIGS. 11B and 12B. As the first side structure 72 of the lower unit 71 rises gradually, the first side structure 82 of the upper unit 81 is moved upward relative to the first side structure 72 of the lower unit 71 by the linkage action of the second side structure 77 of the lower unit 71 and the second side structure 87 of the upper unit 81. Eventually, the lower unit 71 is set up on the base member B, the upper unit 81 is connected longitudinally to the lower unit 71, and the lower unit 71 and the upper unit 81 are joined and locked together by locking mechanisms, not shown, as shown in FIGS. 11C and 12C.

When folding the collapsible structure 70, the locking mechanisms are unfastened to disconnect the lower unit 71 and the upper unit 81 from each other, and the unfolding procedure is reversed.

A collapsible structure 70 in a modification of the collapsible structure 70 in the fourth embodiment will be described with reference to FIGS. 13A to 13C and 14A to 14C. FIG. 13A shows the collapsible structure 70 in a folded state, FIG. 13B shows the collapsible structure 70 in an unfolding process, and FIG. 13C shows the collapsible structure 70 in an unfolded state. FIGS. 14A to 14C are diagrammatic perspective views respectively corresponding to diagrammatic views shown in FIGS. 13A to 13C. The collapsible structure 70 has a lower unit 71 and an upper unit 81.

The lower unit 71 has a first side structure 72 and a second side structure 77. The first side structure 72 is formed in the shape of a box and comprises four longitudinal members, i.e., a first longitudinal member 73*a*, a second longitudinal member 73*b*, a third longitudinal member 73*c* and a fourth longitudinal member 73*d*, four lower transverse members connected to the lower ends of the longitudinal members 73*a*, 73*b*, 73*c* and 73*d*, i.e., a first lower transverse member 74*a*, a second lower transverse member 74*b*, a third lower transverse member 74*c* and a fourth lower transverse member 74*d*, a first upper transverse member 75*a* connecting the respective upper ends of the longitudinal members 73*a* and 73*b*, a second upper transverse member 75*b* connecting the respective upper ends of the longitudinal members 73*a* and 73*c*, and a third upper transverse member 75*c* connecting the respective upper ends of the longitudinal members 73*b* and 73*d*. The respective middle parts of the first longitudinal member 73*a* and the second longitudinal member 73*b*, the respective middle parts of the first longitudinal member 73*a* and the third longitudinal member 73*c*, the respective middle parts of the second longitudinal member 73*b* and the fourth longitudinal member 73*d*, and the respective middle parts of the third longitudinal member 73*c* and the fourth longitudinal members 73*d* are connected by a first intermediate transverse member 76*a*, a second intermediate transverse member 76*b*, a third intermediate transverse member 76*c* and a fourth intermediate transverse member 76*d*, respectively. The first lower transverse member 74a is hinged to a base member B.

The second side structure 77 has a length approximately equal to the distance between the fourth intermediate transverse member 76d and the upper end of the lower unit 71. The lower end of the second side structure 77 is hinged to the fourth intermediate transverse member 76d.

The upper unit 81 has a first side structure 82 and a second side structure 87. The first side structure 82 is formed in the shape of a box and comprises four longitudinal members, i.e., a first longitudinal member 83a, a second longitudinal member 83b, a third longitudinal member 83c and a fourth longitudinal member 83d, a first lower transverse member 84b connecting the respective lower ends of the longitudinal members 83a and 83c, a second lower transverse member 84c connecting the respective lower ends of the longitudinal members 83b and 83d, a third lower transverse member 84d connecting the respective lower ends of the longitudinal members 83c and 83d, a first upper transverse member 85a connecting the respective upper ends of the longitudinal members 83a and 83b, a second upper transverse member 85b connecting the respective upper ends of the longitudinal members 83a and 83c, and a third upper transverse member 85c connecting the respective upper ends of the longitudinal members 83b and 83d. The respective middle parts of the longitudinal members 83a, 83b, 83c and 83d are connected by a first intermediate transverse member 86a, a second intermediate transverse member 86b, a third intermediate transverse member 86c and a fourth intermediate transverse member 86d, respectively. The fourth lower transverse member 84d is hinged to the upper end of the second side structure 77 of the lower unit 71.

The second side structure 87 has a length approximately equal to the distance between the fourth intermediate transverse member 86d and the lower end of the upper unit 81. The upper end of the second side structure 87 is hinged to the first intermediate transverse member 86a, and the lower end of the same is hinged to the first upper transverse member 75a of the first side structure 72 of the lower unit 71.

The upper end of the lower unit 71 and the lower end of the upper unit 81 are locked together by locking mechanisms, not shown, and actuators, such as motors, not shown, are combined with the joints of the first lower transverse member 74a of the lower unit 71 and the base member B, the fourth intermediate transverse member 76d and the second side structure 77 of the lower unit 71, and the first upper transverse member 75a and the second side structure 87 of the upper unit 81 to vary angles between those members.

The collapsible structure 70 thus constructed is folded in a flat shape as shown in FIGS. 13A and 14A with the upper unit 81 laid down on the lower unit 71. When unfolding the collapsible structure 70, the first side structure 72 of the lower unit 71 is turned on the first lower transverse member 74a to raise the same, and the second side structure 77 of the lower unit 71 and the second side structure 87 of the upper unit 81 are turned counterclockwise as shown in FIGS. 13B and 14B. As the first side structure 72 of the lower unit 71 rises gradually, the first side structure 82 of the upper unit 81 is moved upward relative to the first side structure 72 of the lower unit 71 by the linkage action of the second side structure 77 of the lower unit 71 and the second side structure 87 of the upper unit 81, and, eventually, the lower unit 71 is set up on the base member B, the upper unit 81 is connected to the upper end of the lower unit 71, and the lower end of the upper unit 81 and the upper end of the lower unit 71 are joined and locked together by the locking mechanisms, as shown in FIGS. 13C and 14C to unfold the collapsible structure 70 completely.

When folding the collapsible structure 70, the locking mechanisms are unfastened to disconnect the lower unit 71 and the upper unit 81 from each other, and the unfolding procedure is reversed.

Figure 15A:
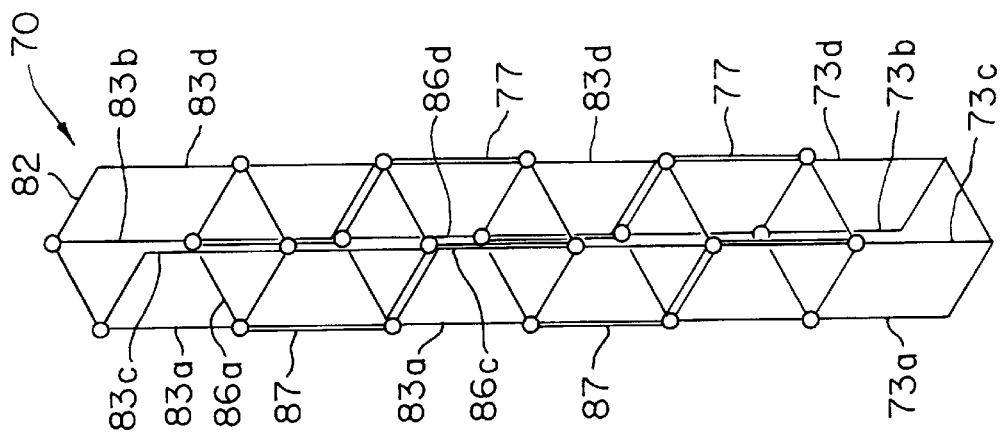
FIGS. 15A, 15B and 15C are diagrammatic perspective views of assistance in explaining a collapsible structure in another modification of the collapsible structure in the fourth embodiment.
Figure 15B:
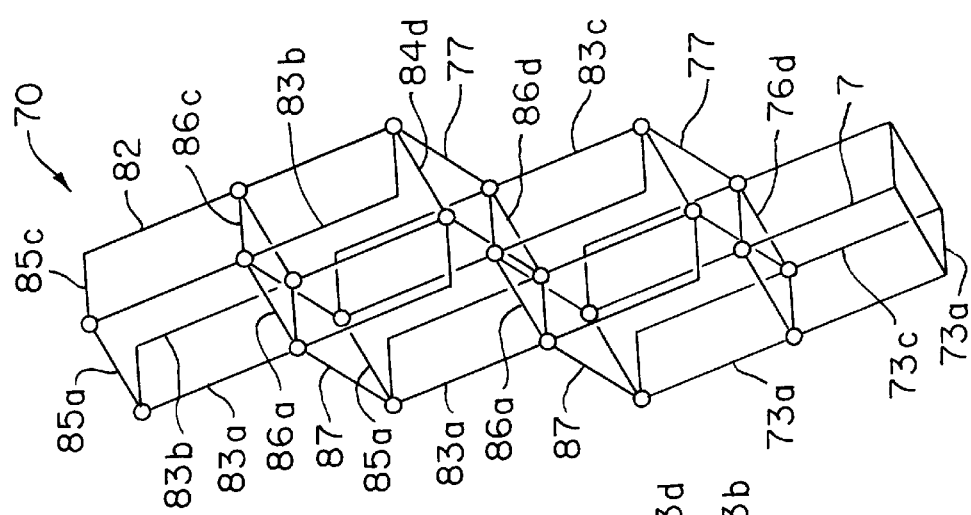
Figure 15C:
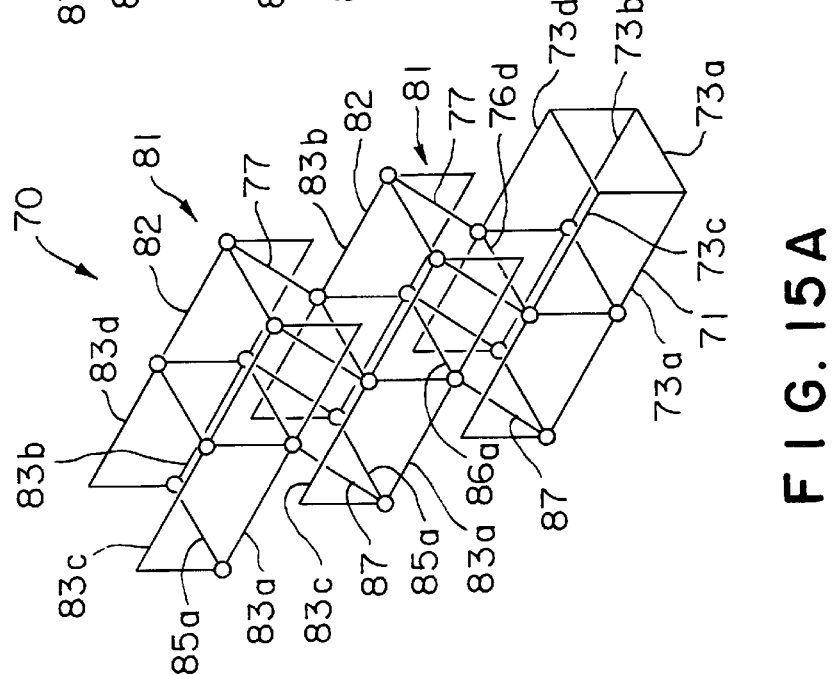

An additional upper unit 81 or a plurality of upper units may be connected to the upper unit 81 to provide a collapsible structure comprising an increased number of upper units as shown in FIGS. 15A to 15C, in which parts like or corresponding to those shown in FIGS. 14A to 14C are designated by the same reference characters and the description thereof will be omitted.

Fifth Embodiment

Figure 17C:
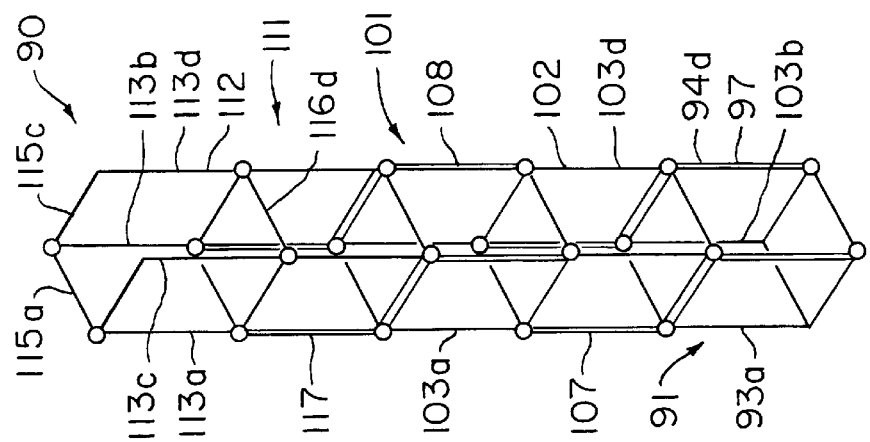
FIGS. 17A, 17B and 17C are diagrammatic perspective views respectively corresponding to FIGS. 16A, 16B and 16C.
Figure 17B:
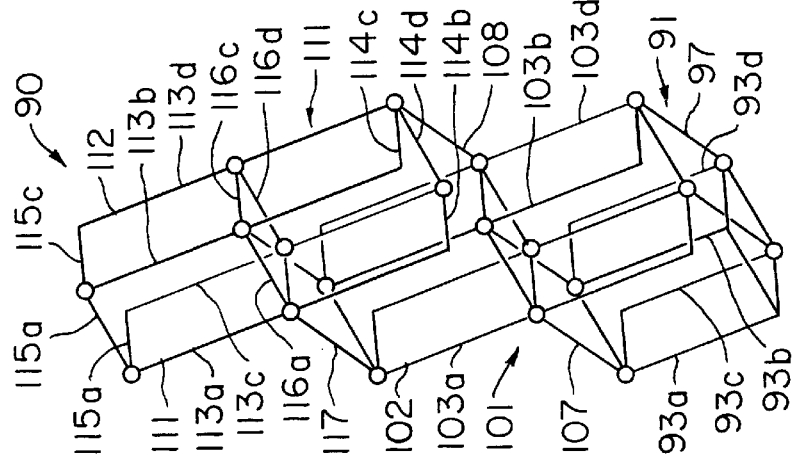
Figure 17A:
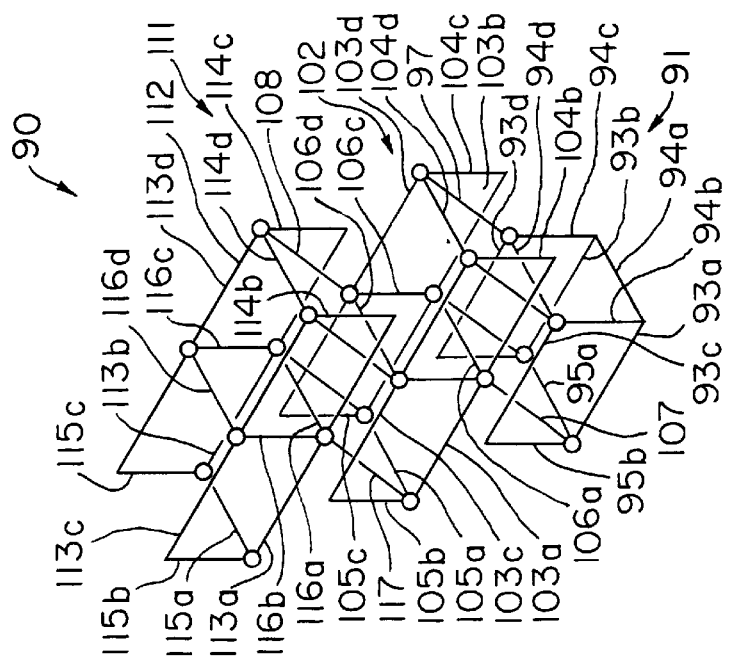

A collapsible structure 90 in a fifth embodiment according to the present invention will be described with reference to FIGS. 16A to 16C and 17A to 17C. FIG. 16A shows the collapsible structure 90 in a folded state, FIG. 16B shows the collapsible structure 90 in an unfolding process, and FIG. 16C shows the collapsible structure 90 in an unfolded state. FIGS. 17A to 17C are diagrammatic perspective views respectively corresponding to diagrammatic views shown in FIGS. 16A to 16C. The collapsible structure 90 has a lower unit 91, a first upper unit 101 and a second upper unit 111.

The lower unit 91 has a first side structure 92 and a second side structure 97. The first side structure 92 is formed in the shape of a box and comprises four longitudinal members, i.e., a first longitudinal member 93a, a second longitudinal member 93b, a third longitudinal member 93c and a fourth longitudinal member 93d, four lower transverse members connected to the lower ends of the longitudinal members 93a, 93b, 93c and 93d, i.e., a first lower transverse member 94a, a second lower transverse member 94b, a third lower transverse member 94c and a fourth lower transverse member 94d, a first upper transverse member 95a connecting the respective upper ends of the longitudinal members 93a and 93b, a second upper transverse member 95b connecting the respective upper ends of the longitudinal members 93a and 93c, and a third upper transverse member 95c connecting the respective upper ends of the longitudinal members 93b and 93d. The first lower transverse member 94a is hinged to a base member B.

The second side structure 97 has a length approximately equal to that of the first side structure 92, and the lower end of the second side structure 97 is hinged to the fourth lower transverse member 94d.

The first upper unit 101 has a first side structure 102 of a length about twice that of the lower unit 91, a second side structure 107 and a third side structure 108. The first side structure 102 is formed in the shape of a box and comprises four longitudinal members, i.e., a first longitudinal member 103a, a second longitudinal member 103b, a third longitudinal member 103c and a fourth longitudinal member 103d, a first lower transverse member 104b connecting the respective lower ends of the longitudinal members 103a and 103c, a second lower transverse member 104c connecting the respective lower ends of the longitudinal members 103b and 103d, a third lower transverse member 104d connecting the respective lower ends of the longitudinal members 103c and 103d, a first upper transverse member 105a connecting the respective upper ends of the longitudinal members 103a and 103b, a second upper transverse member 105b connecting the respective upper ends of the longitudinal members 103a and 103c, a third upper transverse member 105c connecting the respective upper ends of the longitudinal members 103b and 103d, and four intermediate transverse members connecting the middle parts of the longitudinal members 103a, 103b, 103c and 103d, i.e., a first intermediate transverse member 106a, a second intermediate transverse member 106b, a third intermediate transverse member 106c and a fourth intermediate transverse member 106d. The fourth lower transverse member 104d is hinged to the upper end of the second side structure 97 of the lower unit 91.

The second side structure 107 of the first upper unit 101 has a length approximately equal to the distance between the first intermediate transverse member 106a and the lower end of the first side structure of the first upper unit 101, and has an upper end hinged to the first intermediate transverse member 106a and a lower end hinged to the first upper transverse member 95a of the first side structure 92 of the lower unit 91.

The third side structure 108 has a length approximately equal to the distance between the fourth intermediate transverse member 106d and the upper end of the first side structure 102 of the first upper unit 101. The lower end of the third side structure 108 is hinged to the fourth intermediate transverse member 106d.

The second upper unit 111 has a first side structure 112 of a length about twice that of the lower unit 91, and a second side structure 117. The first side structure 112 is formed in the shape of a box and comprises four longitudinal members, i.e., a first longitudinal member 113a, a second longitudinal member 113b, a third longitudinal member 113c and a fourth longitudinal member 113d, a first lower transverse member 114b connecting the respective lower ends of the longitudinal members 113a and 113c, a second lower transverse member 114c connecting the respective lower ends of the longitudinal members 113b and 113d, a third lower transverse member 114d connecting the respective lower ends of the longitudinal members 113c and 113d, a first upper transverse member 115a connecting the respective upper ends of the longitudinal members 113a and 113b, a second upper transverse member 115b connecting the respective upper ends of the longitudinal members 113a and 113c, a third upper transverse member 115c connecting the respective upper ends of the longitudinal members 113b and 113d, and four intermediate transverse members connecting the middle parts of the longitudinal members 113a, 113b, 113c and 113d, i.e., a first intermediate transverse member 116a, a second intermediate transverse member 116b, a third intermediate transverse member 116c and a fourth intermediate transverse member 116d. The fourth lower transverse member 114d is hinged to the upper end of the third side structure 108 of the first upper unit 101.

The second side structure 117 of the second upper unit 111 has a length approximately equal to the distance between the first intermediate transverse member 116a and the lower end of the first side structure 112 of the second upper unit 111, an upper end hinged to the first intermediate transverse member 116a, and a lower end hinged to the first upper transverse member 105a of the first side structure 102 of the first upper unit 101.

The upper end of the lower unit 91 and the lower end of the first upper unit 101, and the lower end of the first upper unit 101 and the upper end of the second upper unit 111 are respectively locked together by locking mechanisms, not shown, and actuators, such as motors, not shown, are combined with the joints of the first lower transverse member 94a of the lower unit 91 and the base member B, the fourth lower transverse member 94d and the second side structure 97 of the lower unit 91, the first upper transverse member 95a of the lower unit 91 and the second side structure 107 of the first upper unit 101, the fourth intermediate transverse member 106d of the first upper unit 101 and the third side structure 108 of the first upper unit 101, and the first upper transverse member 105a of the first upper unit 101 and the second side structure 117 of the second upper unit 111 to vary angles between those members.

The collapsible structure 90 thus constructed is folded in a flat shape as shown in FIGS. 16A and 17A with the first upper unit 101 and the second upper unit 111 laid down in that order on the lower unit 91. When unfolding the collapsible structure 90, the first side structure 92 of the lower unit 91 is turned on the first lower transverse member 94a to raise the same, and the second side structure 97 of the lower unit 91, the second side structure 107 and the third side structure 108 of the first upper unit 101, and the second side structure 117 of the second upper unit 111 are turned counterclockwise as shown in FIGS. 16B and 17B. As the first side structure 92 of the lower unit 91 rises gradually, the first side structure 102 of the first upper unit 101 is moved upward relative to the first side structure 92 of the lower unit 91 by the linkage action of the second side structure 97 of the lower unit 91 and the second side structure 107 of the first upper unit 101. The first side structure 112 of the second upper unit 111 is turned upward relative to the first side structure 102 of the first upper unit 101 by the linkage action of the second side structure 117 of the second upper unit 111 and the third side structure 108 of the first upper unit 101. Then, eventually, the lower unit 91 is set up on the base member B, the lower end of the first upper unit 10 1 is connected to the upper end of the lower unit 91, the lower end of the second upper unit 111 is connected to the upper end of the first upper unit 101. The lower end of the first upper unit 101 and the upper end of the lower unit 91, and the lower end of the second upper unit 111 and the upper end of the first upper unit 101 are joined and locked together by the locking mechanisms, as shown in FIGS. 16C and 17C to unfold the collapsible structure 90 completely.

When folding the collapsible structure 90, the locking mechanisms are unfastened to disconnect the lower unit 91, the first upper unit 101 and the second upper unit 111 from each other, and the unfolding procedure is reversed.

If necessary, the second upper unit 111 may be omitted or one or a plurality of additional upper units may be interposed between the first upper unit 101 and the second upper unit 111.

Figure 18A:
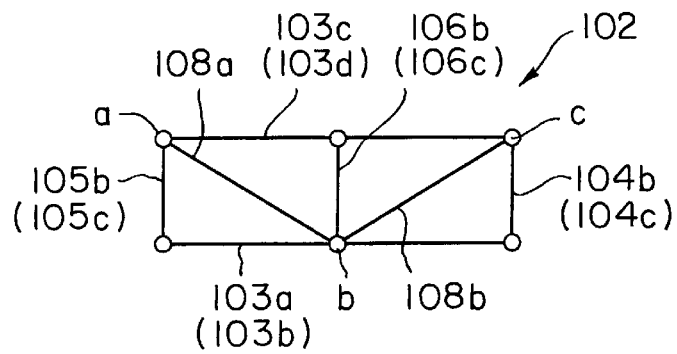
FIGS. 18A and 18B are diagrammatic views of assistance in explaining a construction that enables the collapsible structure in the fifth embodiment to be folded in a flat shape.
Figure 18B:
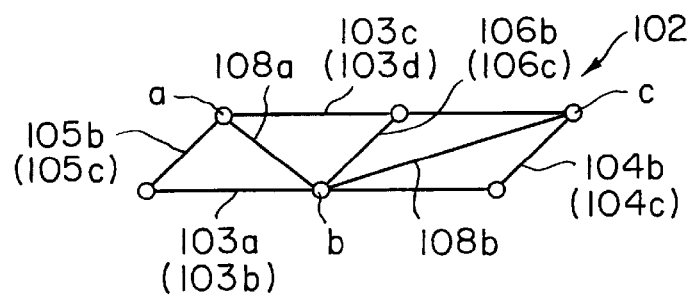

The lower unit 91, the first upper unit 10 1 and the second upper unit 111 can be constructed so as to be folded in a flat shape for storage. A construction that enables the first side structure 102 of the first upper unit 101 to be folded in a flat shape will be described by way of example. Referring to FIGS. 18A and 18B, the ends of the longitudinal members 103a, 103b, 103c and 103d, and the corresponding ends of the lower transverse members 104b and 104c and the upper transverse members 105b and 105c; and the middle parts of the longitudinal members 103c and 103d and the corresponding ends of the intermediate transverse members 106b and 106c are connected by pivot joints, respectively, so that the corresponding members are able to turn relative to each other. The joints a of the longitudinal members 103c and 103d and the upper transverse members 105b and 105c, and the joints b of the longitudinal members 103a and 103b and the intermediate transverse members 106b and 106c are interconnected by first telescopic members 108a, and the joints b of the longitudinal members 103a and 103b and the intermediate transverse members 106b and 106c, and the joints c of the longitudinal members 103c and 103d and the lower transverse members 104b and 104c are interconnected by second telescopic members 108b.

The unfolded first side structure 102 of the first upper unit 101 in an unfolded state shown in FIG. 18A can be folded in a folded state shown in FIG. 18B by a folding procedure which contracts the first telescopic members 108a and extends the second telescopic members 108b. The folded first side structure 102 can be unfolded by reversing the foregoing folding procedure.

Figure 19A:
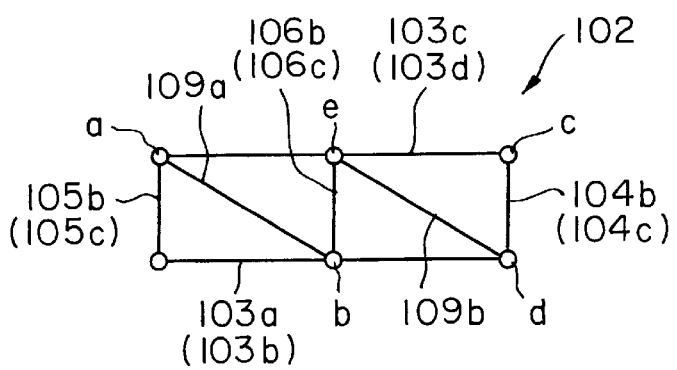
FIGS. 19A and 19B are diagrammatic views of assistance in explaining a second construction that enables the collapsible structure in the fifth embodiment to be folded in a flat shape.
Figure 19B:
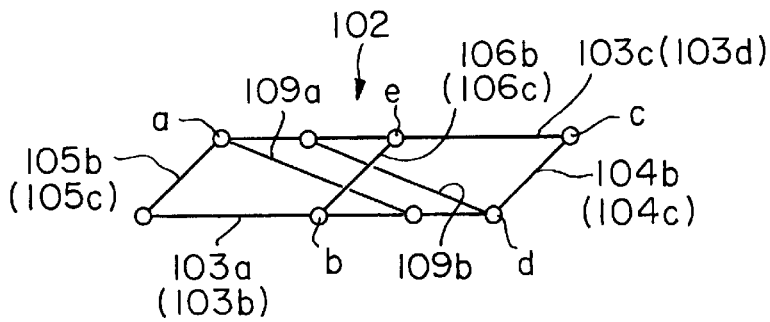

Another construction that enables the first side structure 102 of the first upper unit 101 to be folded in a flat shape will be described below. Referring to FIGS. 19A and 19B, the ends of the longitudinal members 103a, 103b, 103c and 103d, and the corresponding ends of the lower transverse members 104b and 104c and the upper transverse members 105b and 105c; and the middle parts of the longitudinal members 103a, 103b, 103c and 103d and the intermediate transverse members 106b and 106c are connected by pivot joints, respectively, so that the corresponding members are able to turn relative to each other. A first end of each of first diagonal members 109a is connected to each of the joints a of the longitudinal members 103c and 103d and the upper transverse members 105b and 105c by a pivot joint, and a second end of the same is connected slidably to a part of each of the longitudinal members 103a and 103b between each of the joints a of the longitudinal members 103a and 103b and the lower transverse members 104b and 104c, and the corresponding joint b by a sliding pivot joint. A first end of each of second diagonal members 109b is connected to each of the joints d of the longitudinal members 103a and 103b and the lower transverse members 104b and 104c by a pivot joint, and a second end of the same is connected slidably to a part of each of the longitudinal members 103c and 103d between each of the joints e of the longitudinal members 103c and 103d and the intermediate transverse members 106b and 106c, and the corresponding joint a by a sliding pivot joint.

The unfolded first side structure 102 in an unfolded state shown in FIG. 19A can be folded in a folded state shown in FIG. 19B by a folding procedure which slides the second ends of the first diagonal member 109a along the longitudinal members 103a and 103b toward the joints d, and slides the second ends of the second diagonal members 109b along the longitudinal members 103c and 103d toward the joints a. This folding procedure is reversed to unfold the first side structure 102 in the folded state shown in FIG. 19B into an unfolded state shown in FIG. 19A.

Figure 20A:
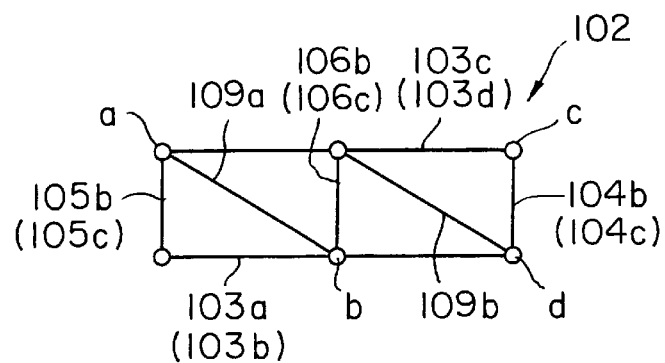
FIGS. 20A and 20B are diagrammatic views of assistance in explaining a third construction that enables the collapsible structure in the fifth embodiment to be folded in a flat shape.
Figure 20B:
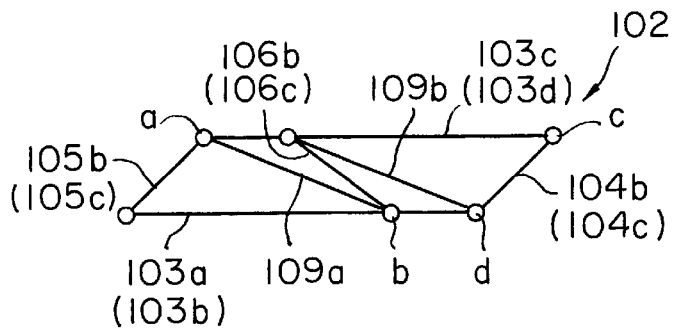

A third construction that enables the first side structure 102 of the first upper unit 101 to be folded in a flat shape will be described below. Referring to FIGS. 20A and 20B, the ends of the longitudinal members 103a, 103b, 103c and 103d, and the corresponding ends of the lower transverse members 104b and 104c and the upper transverse members 105b and 105c are connected by pivot joints, respectively, so that the corresponding members are able to turn relative to each other. The opposite ends of the intermediate transverse members 106b and 106c are connected slidably to the middle parts of the longitudinal members 103a, 103b, 103c and 103d by sliding pivot joints, respectively. A first end of each of first diagonal members 109a is connected to each of the joints a of the longitudinal members 103c and 103d and the upper transverse members 105b and 105c by a pivot joint, and a second end of the same is connected to one end of each of the intermediate transverse members 106b and 106c by a pivot joint. A first end of each of second diagonal members 109b is connected to each of the joints d of the longitudinal members 103a and 103d and the lower transverse members 104b and 104c by a pivot joint, and a second end of the same is connected to the other end of each of the intermediate transverse members 106b and 106c.

The unfolded first side structure 102 in an unfolded state shown in FIG. 20A can be folded in a folded state shown in FIG. 20B by a folding procedure which slides the opposite ends of the intermediate transverse members 106a and 106b along the longitudinal members 103a, 103b, 103c and 103d. This folding procedure is reversed to unfold the first side structure 102 in the folded state shown in FIG. 20B into an unfolded state shown in FIG. 20A.

Figure 21A:
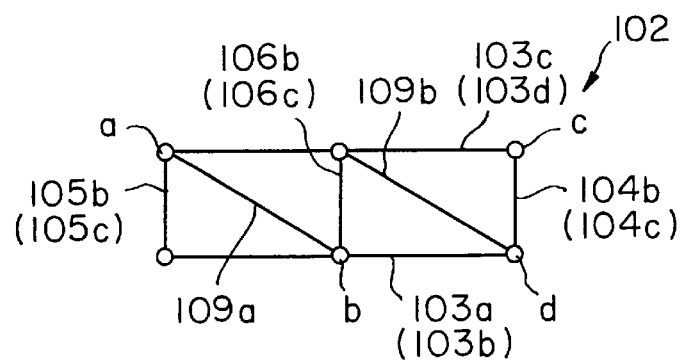
FIGS. 21A and 21B are diagrammatic views of assistance in explaining a fourth construction that enables the collapsible structure in the fifth embodiment to be folded in a flat shape.
Figure 21B:
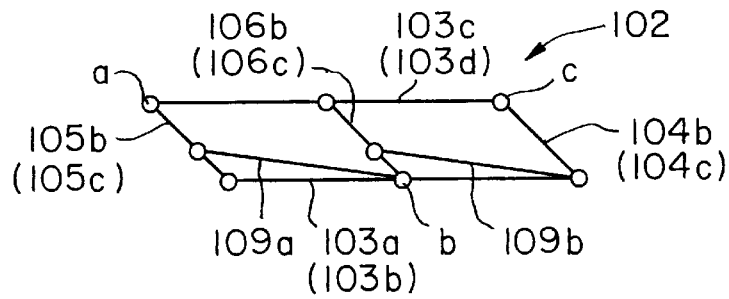

A fourth construction that enables the first side structure 102 of the first upper unit 101 to be folded in a flat shape will be described below. Referring to FIGS. 21A and 21B, as mentioned above, the corresponding ends of the longitudinal members 103a, 103b, 103c and 103d, the lower transverse members 104b and 104c, the upper transverse members 105b and 105c and the intermediate transverse members 106b and 106c are connected by pivot joints, respectively, so that the corresponding members are able to turn relative to each other. A first end of each of second diagonal members 109a is connected to each of the joints b, and a second end of the same is connected slidably to each of the upper transverse members 105b and 105c by a sliding pivot joint. A first end of each of second diagonal members 109b is connected to each of the joints d by a pivot joint and a second end of the same is connected slidably to each of the intermediate transverse members 106b and 106c by a sliding pivot joint.

The unfolded first side structure 102 in an unfolded state shown in FIG. 21A can be folded in a folded state shown in FIG. 21B by a folding procedure which slides the second ends of the first diagonal members 109a and the second diagonal members 109b along the upper transverse members 105b and 105c and the intermediate transverse members 106b and 106c, respectively. This folding procedure is reversed to unfold the first side structure 102 in the folded state shown in FIG. 21B into an unfolded state shown in FIG. 21A.

Sixth Embodiment

A composite collapsible structure in a sixth embodiment according to the present invention will be described with reference to FIGS. 22A to 22D, in which parts like or corresponding to those shown in FIGS. 10A to 10D are designated by the same reference characters and the description thereof will be omitted.

The composite collapsible structure in the sixth embodiment is constructed by combining a plurality of collapsible structures 60 similar to that shown in FIGS. 10A to 10D. The plurality of collapsible structures 60 are movable along guide rails or the like relative to each other. The adjacent edges of the side substructures 52B of the lower units 51 of the adjacent collapsible structures 60 are hinged to each other so that the side substructures 52B are able to turn relative to each other. The adjacent edges of the side substructures 55B of the adjacent first upper units 54 are hinged to each other so that the side substructures 55B are able to turn relative to each other. The adjacent edges of the side substructures 62B of the adjacent second lower units 61 are hinged to each other so that the side substructures 62B are able to turn relative to each other. The adjacent edges of the side substructures 65B of the adjacent second upper units 64 are hinged to each other so that the side substructures 65B are able to turn relative to each other.

Figure 22A:
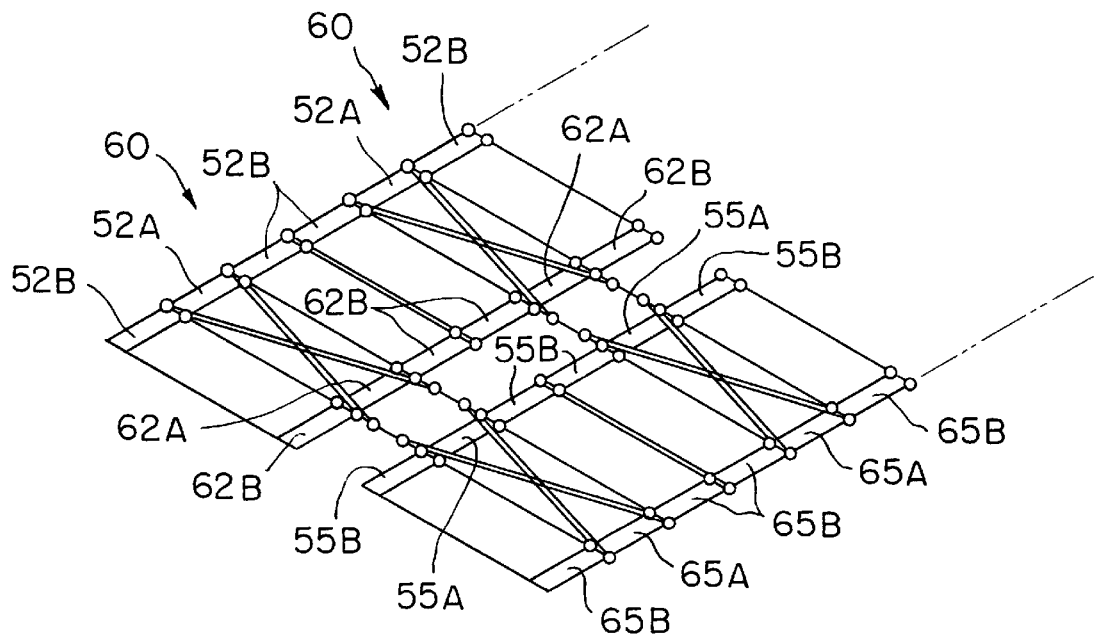
FIGS. 22A, 22B, 22C and 22D are diagrammatic perspective views of a collapsible structure in a sixth embodiment according to the present invention.

Referring to FIG. 22A, in each collapsible structure 60, the side substructures 52B, 55B, 62B and 65B having the edges hinged to each other are laid down so as to be included in a plane including the corresponding main substructures 52A, 55A, 62A and 65A; and the first lower unit 51, the first upper unit 54, the second lower unit 61 and the second upper unit 64 are stacked in layers to fold the composite collapsible structure in a flat shape.

Figure 22B:
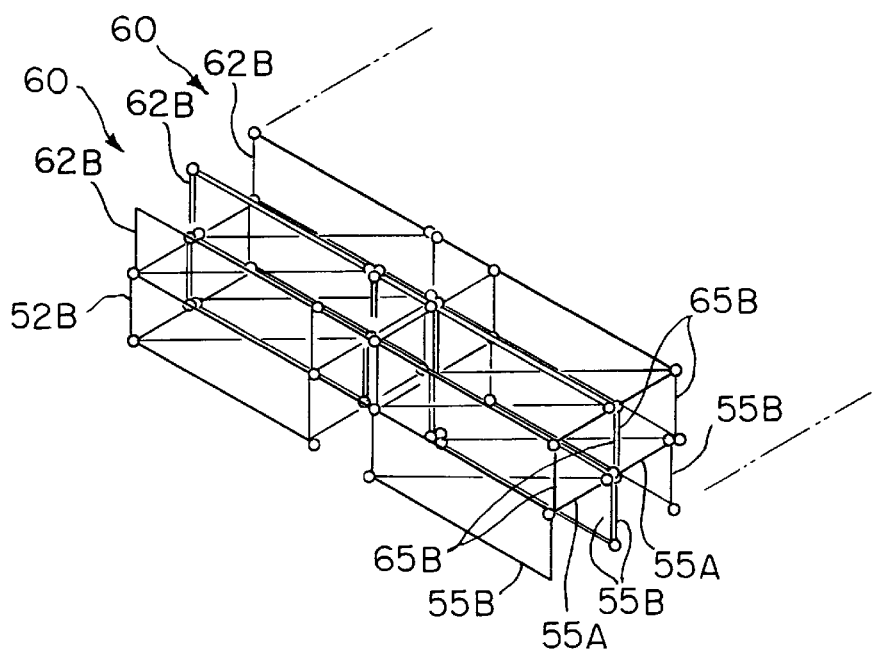
Figure 22D:
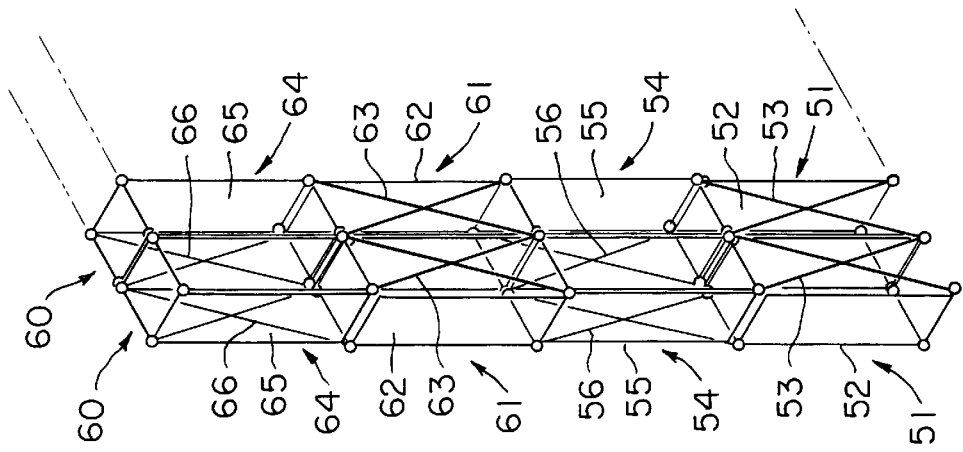
Figure 22C:
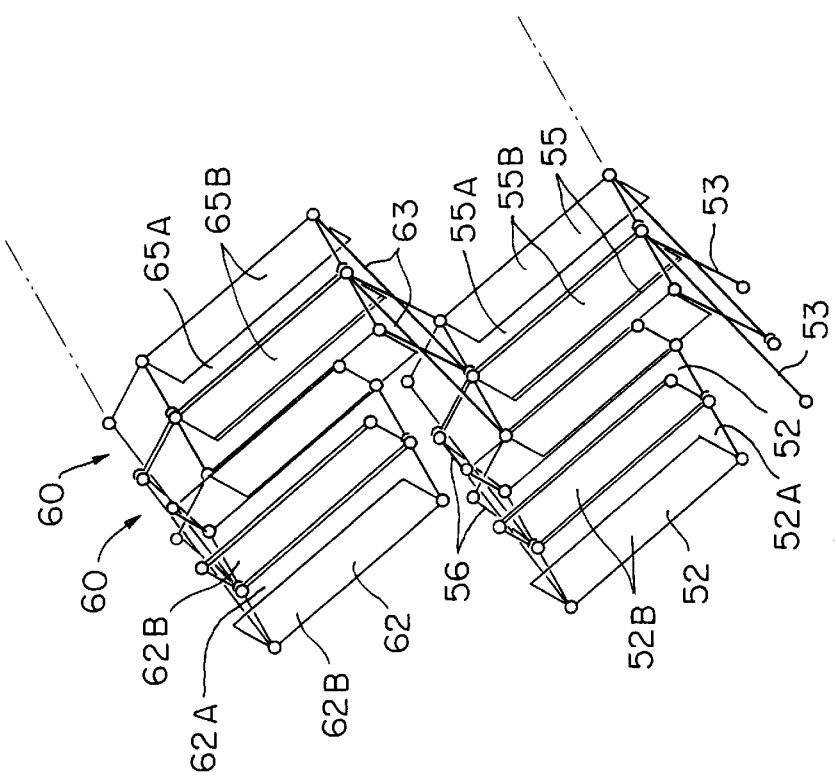
Figure 23:
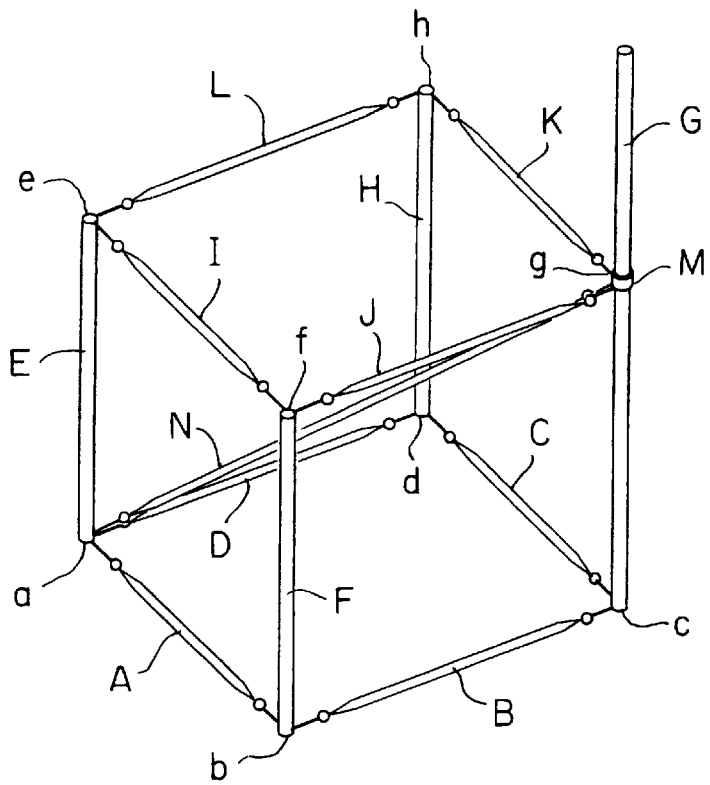
FIG. 23 is a schematic perspective view of a prior art collapsible structure.
Figure 24:
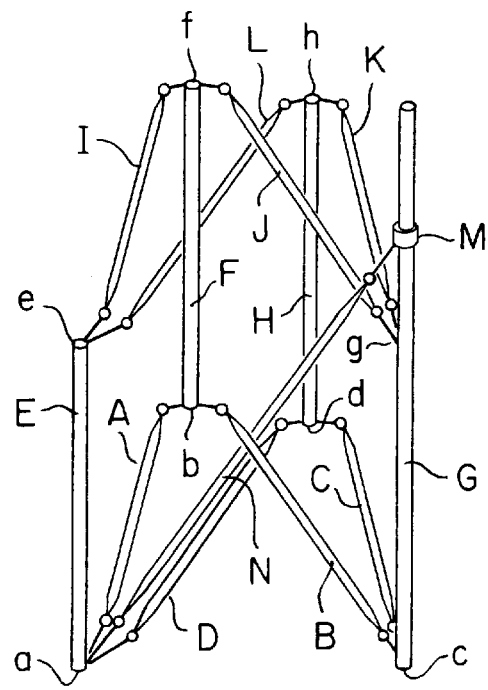
FIG. 24 is a schematic perspective view of the collapsible structure of FIG. 23 in an unfolding process.

When unfolding the composite collapsible structure, the adjacent collapsible structures 60 are moved toward each other, the side substructures 52B, 55B, 62B and 65B are raised and set perpendicularly to the corresponding main substructures 52A, 55A, 62A and 65A as shown in FIG. 22B, the collapsible structures 60 are unfolded similarly to the collapsible structure 60 in the third embodiment so that the first lower unit 51 is set up on the base member B, and the first upper unit 54, the second lower unit 61 and the second upper unit 64 are set in that order on the first lower unit 51. Thus, the plurality of unfolded collapsible structures 60 are connected successively to form the large composite collapsible structure shown in FIG. 22D.

The composite collapsible structure may additionally be provided with more upper and side units.

The side substructures 52B, 55B, 62B and 65B may be laid down so as to extend on the opposite sides of the corresponding main substructures 52A, 55A, 62A and 65A as shown in FIG. 8A, and the same may be raised as shown in FIG. 8B when the collapsible structure 60 is unfolded. When the collapsible structures 60 are thus constructed, the adjacent collapsible structures 60 need not be moved relative to each other, the composite collapsible structure can be folded in a shape requiring a storage space of a reduced area. The side substructures 52B, 55B, 62B and 65B of the first side structures 52, 55, 62 and 65 of the first lower unit 51, the first upper unit 54, the second lower unit 61 and the second upper unit 64 may be bound together, or one of the adjacent side substructures 52B, one of the adjacent side substructures 55B, one of the adjacent side substructures 61B and one of the adjacent side substructures 64B may be omitted.

The foregoing embodiments employ the coil springs or the motors as actuators, the present invention may use any suitable actuators other than the coil springs and the motors. The present invention is not limited in its practical application to those collapsible structures specifically described herein, and may be embodied, for example, in portable emergency temporary buildings.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A collapsible structure capable of being set in a folded state and an unfolded state, said collapsible structure comprising:
   a base member;
   a first lower unit comprising a first side structure having a base end pivotally supported on to the base member, and a second side structure separated from the first side structure and having a base end pivotally supported on to the base member; and
   a first upper unit comprising a first side structure pivotally supported on a top end of the second side structure of the first lower unit, and a second side structure having a base end pivotally supported on to the first side structure of the first lower unit and a top end pivotally supported on the first side structure of the first upper unit;
   wherein the first and the second side structure of the first lower unit are laid down so that the respective top ends thereof are separated from each other, the second side structure of the first upper unit is laid down on the first side structure of the first lower unit, and the first side structure of the first upper unit is laid down on the second side structure of the first lower unit in a folded state; and the first and the second side structure of the first lower unit are set up on the base member, and the first upper unit having the first and the second side structure is set up on the first lower unit in an unfolded state.

2. The collapsible structure according to claim 1, wherein the first side structure of the first lower unit has a U-shaped cross section and is formed by connecting a pair of opposite side substructures to opposite side edges of a main substructure, the second side structure of the first lower unit has a flat shape and has a base end pivotally supported on the base member, the first side structure and the second side structure are combined to form the first lower unit having a substantially rectangular cross section in an unfolded state;
   the first side structure of the first upper unit has a U-shaped cross section and is formed by connecting a pair of side substructures to opposite side edges of a main substructure pivotally connected to the top end of the second side structure of the first lower unit, the second side structure of the first upper unit has a flat shaft and has a base end pivotally supported on the first side structure of the first lower unit, and the first side structure and the second side structures are combined to form the first upper unit having a substantially rectangular cross section in an unfolded state.

3. The collapsible structure according to claim 1, wherein the top end of the second side structure of the first upper unit, and the top end of the first side structure of the first upper unit are connected pivotally to an upper member.

4. The collapsible structure according to claim 2, wherein each of the side substructures of the first side structure of the first lower unit or the first upper unit can be turned on each of the side edges of the main substructure between a folded position parallel to the main substructure and an unfolded position substantially perpendicular to the main substructure.

5. The collapsible structure according to claim 2, wherein each of the side substructures of the first side structure of the first lower unit or the first upper unit can be folded along each of the side edges of the main substructure of the first side structure.

6. The collapsible structure according to claim 3, further comprising:
   a second lower unit comprising a first side structure having a U-shaped cross section, and a second side structure having a base end pivotally supported on the upper member; said first side structure having a main substructure pivotally supported on the upper member, and a pair of opposite side substructures connected to opposite side edges of the main substructure;
   a second upper unit comprising a first side structure having a U-shaped cross section, and a second side structure having a base end pivotally supported on the top end of the main substructure of the first side structure of the second lower unit, said first side structure having a main substructure pivotally supported on the main substructure of the first side structure of the second lower unit, and a pair of opposite side substructures connected to opposite side edges of the main substructure; and an additional upper member pivotally connected to the respective top ends of the first and the second side structure of the second upper unit.

7. The collapsible structure according to claim 6, wherein each of the side substructures of the first side structure of the first lower unit, the first upper unit, the second lower unit or the second upper unit can be turned on each of the side edges of the main substructure between a folded position parallel to the main substructure and an unfolded position substantially perpendicular to the main substructure.

8. The collapsible structure according to claim 6, wherein each of the side substructures of the first side structure of the first lower unit, the first upper unit, the second lower unit or the second upper unit can be folded along each of the side edges of the main substructure of the first side structure.

9. A collapsible structure capable of being set in a folded state and an unfolded state, said collapsible structure comprising:

a base member;
a first lower unit comprising a first side structure having a base end pivotally supported on the base member, and a second side structure having a base end pivotally supported on the first side structure;
a first upper unit comprising a first side structure pivotally supported on a top end of the second side structure of the first lower unit, and a second side structure having a base end pivotally supported on the first side structure of the first lower unit and a top end pivotally supported on the first side structure of the first upper unit;
wherein the first side structure of the first lower unit is laid down on the base member and the first side structure of the first upper unit is laid down on the first side structure of the first lower unit when the collapsible structure is in a folded state; the first side structure of the first lower unit is set up on the base member, and the first side structure of the first upper unit is set up on the first side structure of the first lower unit set up on the base member by turning the second side structure of the first lower unit and the second side structure of the first upper unit when the collapsible structure is in an unfolded state.

10. The collapsible structure according to claim 9, wherein the first side structure of the first lower unit is formed by assembling:

first, second, third and fourth longitudinal members parallel to each other,
first, second, third and fourth lower transverse members interconnecting respective lower ends of the longitudinal members,
first, second and third upper transverse members respectively interconnecting upper ends of the first and the second longitudinal member, upper ends of the first and the third longitudinal member, and upper ends of the second and the fourth longitudinal member, and
first, second, third and fourth intermediate transverse members interconnecting middle parts of the first and the second longitudinal member, middle parts of the first and the third longitudinal member, middle parts of the second and the fourth longitudinal member, and middle parts of the third and the fourth longitudinal member;
the first lower transverse member is pivotally connected to the base member;

the second side structure of the first lower unit has a base end pivotally connected to the fourth intermediate transverse member of the first side structure of the first lower unit;

the first side structure of the first upper unit is formed by assembling:

first, second, third and fourth longitudinal members parallel to each other,
first, second and third lower transverse members respectively interconnecting lower ends of the first and the third longitudinal member, lower ends of the second and the fourth longitudinal member, and lower ends of the third and the fourth longitudinal member,
first, second and third upper transverse members respectively interconnecting upper ends of the first and the second longitudinal member, upper ends of the first and the third longitudinal member, and upper ends of the second and the fourth longitudinal member, and
first, second, third and fourth intermediate transverse members interconnecting middle parts of the first and the second longitudinal member, middle part of the first and the third longitudinal member, middle parts of the second and the fourth longitudinal member, and middle parts of the third and the fourth longitudinal member;
the third lower transverse member is pivotally connected to a top end of the second side structure of the first lower unit; and
the second side structure of the first upper unit has a base end pivotally connected to the first upper transverse member of the first side structure of the first lower unit, and a top end pivotally connected to the first intermediate transverse member of the first side structure of the first upper unit.

11. The collapsible structure according to claim 10, wherein the first longitudinal member and the second upper transverse member, the second upper transverse member and the third longitudinal member, the third longitudinal member and the second lower transverse member, and the second lower transverse member and the first longitudinal member of the first lower unit are connected pivotally, respectively, so as to be able to be laid down on the first longitudinal member;

the first longitudinal member and the second upper transverse member, the second upper transverse member and the third longitudinal member, the third longitudinal member and the second lower transverse member, and the second lower transverse member and the first longitudinal member of the first upper unit are connected pivotally, respectively, so as to be able to be laid down on the first longitudinal member;

the second longitudinal member and the third upper transverse member, the third upper transverse member and the fourth longitudinal member, the fourth longitudinal member and the third lower transverse member, and the third lower transverse member and the second longitudinal member of the first lower unit are connected pivotally so as to be laid down on and along the second longitudinal member; and the second longitudinal member and the third upper transverse member, the third upper transverse member and the fourth longitudinal member, the fourth longitudinal member and the third lower transverse member, and the third lower transverse member and the second longitudinal member of the first upper unit are connected pivotally so as to be laid down on and along the second longitudinal member.

12. The collapsible structure according to claim 9, wherein the first side structure of the first lower unit is formed by assembling:
 first, second, third and fourth longitudinal members parallel to each other,
 first, second, third and fourth lower transverse members interconnecting respective lower ends of the longitudinal members, and
 first, second and third upper transverse members respectively interconnecting upper ends of the first and the second longitudinal member, upper ends of the first and the third longitudinal member, and upper ends of the second and the fourth longitudinal member;
 the first lower transverse member is pivotally connected to the base member;
 the second side structure of the first lower unit has a base end pivotally connected to the fourth lower transverse member of the first side structure of the first lower unit;
 the first side structure of the first upper unit is formed by assembling:
 first, second, third and fourth longitudinal members parallel to each other,
 first, second and third lower transverse members respectively interconnecting lower ends of the first and the third longitudinal member, lower ends of the second and the fourth longitudinal member, and lower ends of the third and the fourth longitudinal member,
 first, second and third upper transverse members respectively interconnecting upper ends of the first and the second longitudinal member, upper ends of the first and the third longitudinal member, and upper ends of the second and the fourth longitudinal member, and
 first, second, third and fourth intermediate transverse members interconnecting middle parts of the first and the second longitudinal member, middle part of the first and the third longitudinal member, middle parts of the second and the fourth longitudinal member, and middle parts of the third and the fourth longitudinal member;
 the third lower transverse member is pivotally connected to a top end of the second side structure of the first lower unit; and
 the second side structure of the first upper unit has a base end pivotally connected to the first upper transverse member of the first side structure of the first lower unit, and a top end pivotally connected to the first intermediate transverse member of the first side structure of the first upper unit.

13. The collapsible structure according to claim 12, wherein the first longitudinal member and the second upper transverse member, the second upper transverse member and the third longitudinal member, the third longitudinal member and the second lower transverse member, and the second lower transverse member and the first longitudinal member of the first lower unit are connected pivotally, respectively, so as to be able to be laid down on the first longitudinal member;
 the first longitudinal member and the second upper transverse member, the second upper transverse member and the third longitudinal member, the third longitudinal member and the second lower transverse member, and the second lower transverse member and the first longitudinal member of the first upper unit are connected pivotally, respectively, so as to be able to be laid down on the first longitudinal member;
 the second longitudinal member and the third upper transverse member, the third upper transverse member and the fourth longitudinal member, the fourth longitudinal member and the third lower transverse member, and the third lower transverse member and the second longitudinal member of the first lower unit are connected pivotally so as to be laid down on and along the second longitudinal member; and
 the second longitudinal member and the third upper transverse member, the third upper transverse member and the fourth longitudinal member, the fourth longitudinal member and the third lower transverse member, and the third lower transverse member and the second longitudinal member of the first upper unit are connected pivotally so as to be laid down on and along the second longitudinal member.

14. A composite collapsible structure comprising a plurality of collapsible structures according to claim 4, and arranged in a row so as to be movable toward and away from each other by pivotally connecting end parts of the side substructures of the first side structure of the first lower unit and the first upper unit.

15. A composite collapsible structure comprising a plurality of collapsible structures according to claim 5, and assembled by joining together side substructures of the adjacent first side structures of the first lower unit and the first upper unit, or by sharing each side substructure by the adjacent first side structures of the first lower unit and the first upper unit.

16. A composite collapsible structure comprising a plurality of collapsible structures according to claim 7, and arranged in a row so as to be movable toward and away from each other by pivotally connecting end parts of the side substructures of the first side structure of the first lower unit, the first upper unit, the second lower unit and the second upper unit.

17. A composite collapsible structure comprising a plurality of collapsible structures according to claim 8, and assembled by joining together side substructures of the adjacent first side structures of the first lower unit, the first upper unit, the second lower unit and the second upper unit, or by sharing each side substructure by the adjacent first side structures of the first lower unit, the first upper unit, the second lower unit and the second upper unit.

* * * * *